(12) United States Patent
Bell et al.

(10) Patent No.: US 10,174,171 B2
(45) Date of Patent: *Jan. 8, 2019

(54) NANOPOROUS FILMS DERIVED FROM POLYCYCLO-OLEFINIC BLOCK POLYMERS

(71) Applicants: PROMERUS, LLC, Brecksville, OH (US); THE UNIVERSITY OF AKRON, Akron, OH (US)

(72) Inventors: Andrew Bell, Brecksville, OH (US); Oleksandr Burtovyy, Brecksville, OH (US); Bryan D Vogt, Akron, OH (US); Changhuai Ye, Cuyahoga Falls, OH (US)

(73) Assignees: PROMERUS, LLC, Brecksville, OH (US); THE UNIVERSITY OF AKRON, Akron, OH (US)

(*) Notice: Subject to any disclaimer, the term of this patent is extended or adjusted under 35 U.S.C. 154(b) by 213 days.

This patent is subject to a terminal disclaimer.

(21) Appl. No.: 15/211,102

(22) Filed: Jul. 15, 2016

(65) Prior Publication Data

US 2017/0015790 A1 Jan. 19, 2017

Related U.S. Application Data

(60) Provisional application No. 62/193,860, filed on Jul. 17, 2015.

(51) Int. Cl.
*B01D 61/36* (2006.01)
*B01D 67/00* (2006.01)
*B01D 71/32* (2006.01)
*B01D 71/44* (2006.01)
*B01D 71/80* (2006.01)
*B05D 3/00* (2006.01)
*C08G 81/00* (2006.01)
(Continued)

(52) U.S. Cl.
CPC .......... *C08G 81/00* (2013.01); *B01D 67/0009* (2013.01); *B01D 71/44* (2013.01); *B01D 71/80* (2013.01); *B05D 3/007* (2013.01); *C09D 5/006* (2013.01); *C09D 145/00* (2013.01); *B01D 61/362* (2013.01); *B01D 71/32* (2013.01)

(58) Field of Classification Search
None
See application file for complete search history.

(56) References Cited

U.S. PATENT DOCUMENTS 3,330,815 A * 7/1967 McKeon .................... C08F 4/80
106/267
5,087,677 A * 2/1992 Brekner .................. C07F 17/00
526/127

(Continued)

*Primary Examiner* — Ana M Fortuna
(74) *Attorney, Agent, or Firm* — Balaram Gupta

(57) ABSTRACT

A nanoporous film formed from a series of vinyl addition block polymers derived from functionalized norbornene monomers are disclosed and claimed. The nanoporous films as disclosed herein are useful as pervaporation membranes and antireflective coatings among various other uses. Also disclosed herein are the fabrication of nanoporous films into pervaporation membranes which exhibit unique separation properties, and their use in the separation of organic volatiles from biomass and/or organic waste, including butanol, phenol, and the like. The fabrication of nanoporous films into antireflective coatings are also disclosed.

20 Claims, 5 Drawing Sheets

(51) Int. Cl.
*C09D 5/00* (2006.01)
*C09D 145/00* (2006.01)

(56) References Cited

U.S. PATENT DOCUMENTS

| | | | |
|---|---|---|---|
| 9,468,890 B2* | 10/2016 | Bell | B01D 67/0009 |
| 9,610,549 B2* | 4/2017 | Bell | C08F 299/02 |
| 2008/0085979 A1 | 4/2008 | Ohkita | |
| 2009/0188863 A1* | 7/2009 | Knapp | B01D 61/362 |
| | | | 210/640 |
| 2014/0042090 A1* | 2/2014 | Bell | B01D 67/0009 |
| | | | 210/640 |
| 2016/0369026 A1* | 12/2016 | Bell | B01D 67/0009 |
| 2017/0015790 A1* | 1/2017 | Bell | C08G 81/00 |

* cited by examiner

NANOPOROUS FILMS DERIVED FROM POLYCYCLO-OLEFINIC BLOCK POLYMERS

CROSS REFERENCE TO RELATED APPLICATIONS

This application claims the benefit of U.S. Provisional Application No. 62/193,860, filed Jul. 17, 2015, which is incorporated herein by reference in its entirety.

BACKGROUND OF THE INVENTION

Field of the Invention

The present invention relates generally to nanoporous films formed from a series of block polymers derived from cyclo-olefinic monomers and more specifically use of such films in pervaporation processes, water purification and as antireflective coatings.

Description of the Art

A wide variety of nanoporous organic materials have been reported in the literature having a broad spectrum of applications including separation membranes, battery separators, microelectronics and anti-reflective coatings. This is partly due to the fact that nanoporous materials especially in the form of films feature high pore density, low dielectric constant and low refractive index. Although the exact structure needed is driven by the intended application most sought after property being mechanical properties and retention of pore size, porosity and pore connectivity. For example, anti-reflective coatings require both high porosity (low refractive index) and small pore size (below diffraction limit). One challenge to fabricate nanoporous organic polymeric films with high porosity (>50%) is their relatively weak mechanical properties that lead to the collapse of the desired nanopore structure.

It has been reported in the literature that block copolymers (BCPs) can be used to form nanoscale structures via self-assembly with the size tunable by the molecular weight. For example, polystyrene-block-poly(methyl methacrylate) (PS-b-PMMA) and polystyrene-block-polylactide (PS-b-PLA) have been used to form such self assembled structures, where PMMA can suitably be removed by ozone, chemical treatment, see for example, U. S. Patent Application Publication No. US2011/0120970 A1. Also see, WO2012/035292 A2. Similarly, the lactide block in a PS-b-PLA has reportedly been removed by suitable hydrolytic degradation, see for example, Zalusky, et al., J. Am. Chem. Soc., Vol. 124 (No. 43), pp 12761-12773 (2002).

It has also been reported in the literature that solvent swelling can induce porous structure in block copolymers. For instance nanopores have been formed by swelling of block copolymers such as PS-b-PMMA or polystyrene-block-poly(2-vinyl pyridine (PS-b-P2VP). In the latter case for example the selective swelling of P2VP cylinders by ethanol leads to plastic deformation of majority PS phase to generate highly ordered nanopores after drying. See for example, Yin et al., ACS Nano, Vol. 7, pp 9961-9974 (2013). However, the porosity of the films so formed is low (<25%). Although the porosity could be increased by swelling the majority phase and using minority phase as the mechanical support during drying, the challenge is to prevent collapse of the swollen structure at least due to three main factors. First, the mechanical properties of the solvent swollen block copolymer may significantly be decreased compared to the neat copolymer. Second, the magnitude of the capillary force developed on evaporation of the solvent increases as the pore size decreases leading to a large applied stress. Third, as the porosity increase, the wall thickness decreases which further reduces resistance to deformation by external stress.

Accordingly, it is an object of this invention to provide a series of block polymers derived from polycycloolefinic monomers, more specifically, suitably functionalized norbornene monomers, which exhibit high glass transition temperatures, greater than 300° C., and high mechanical properties. The block polymers of this invention can also be tailored such that they can provide a significant solubility contrast for swelling.

It is also an object of this invention to provide processes for the generation of stable, high porosity films as disclosed herein.

It is further an object of this invention to provide high porosity nanoporous films which exhibit robust mechanical properties having a variety of applications including pervaporation membranes and antireflection properties, among various other uses.

Other objects and further scope of the applicability of the present invention will become apparent from the detailed description that follows.

SUMMARY OF THE INVENTION

Advantageously it has now been found that various block polymers as described herein are useful for forming nanoporous films. The films formed from the block copolymers are useful for example as pervaporation membranes in separation of organics from biomass or other organic wastes as described herein; and as antireflective coatings.

Accordingly, there is provided a nanoporous film comprising a diblock polymer of the formula (I):

where a and c are integers of at least 15;

b denotes a bond;

A and B are different from each other and independently selected from a repeat unit represented by formula (IIA), said repeat unit is derived from a monomer of formula (II):

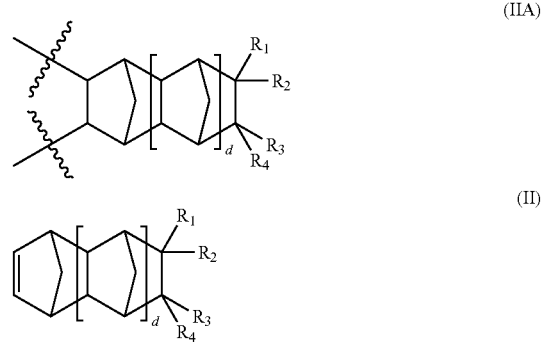

wherein:

⌇⌇⌇ denotes a place of bonding with another repeat unit;

d is an integer 0, 1 or 2;

where for repeat unit A, at least one of $R_1$, $R_2$, $R_3$ and $R_4$ is selected from the group consisting of formulae D, E, F, G and H:

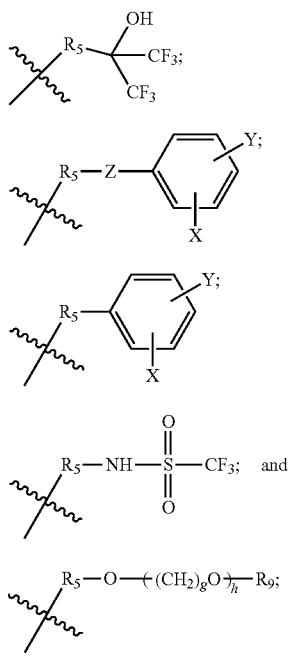

where g and h are integers from 1 to 4;

$R_5$ is a bond or $(C_1\text{-}C_6)$alkylene or $(C_1\text{-}C_4)$alkylene-O—$(C_1\text{-}C_4)$alkylene;

$R_9$ is $(C_1\text{-}C_{16})$alkyl;

X is hydroxy or $(C_1\text{-}C_4)$alkanoyl;

Y is hydrogen, linear or branched $(C_1\text{-}C_{16})$alkyl, $(C_6\text{-}C_{10})$aryl$(C_1\text{-}C_3)$alkyl, linear or branched $(C_1\text{-}C_{16})$alkoxy or $(C_6\text{-}C_{10})$aryl$(C_1\text{-}C_3)$alkoxy; and Z is

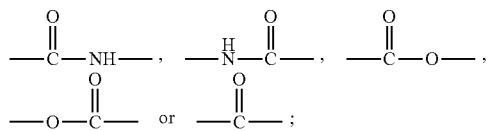

the remaining $R_1$, $R_2$, $R_3$ and $R_4$ are the same or different and each independently of one another is selected from hydrogen, linear or branched $(C_1\text{-}C_{16})$alkyl, hydroxy$(C_1\text{-}C_{16})$alkyl, perfluoro$(C_1\text{-}C_{12})$alkyl, $(C_3\text{-}C_{12})$cycloalkyl, $(C_6\text{-}C_{12})$bicycloalkyl, $(C_7\text{-}C_{14})$tricycloalkyl, $(C_6\text{-}C_{10})$aryl, $(C_6\text{-}C_{10})$aryl$(C_1\text{-}C_3)$alkyl, perfluoro$(C_6\text{-}C_{10})$aryl, perfluoro$(C_6\text{-}C_{10})$aryl$(C_1\text{-}C_3)$alkyl, hydroxy, $(C_1\text{-}C_{12})$alkoxy, $(C_3\text{-}C_{12})$cycloalkoxy, $(C_6\text{-}C_{12})$bicycloalkoxy, $(C_7\text{-}C_{14})$tricycloalkoxy, $(C_6\text{-}C_{10})$aryloxy$(C_1\text{-}C_3)$alkyl, $(C_5\text{-}C_{10})$heteroaryloxy$(C_1\text{-}C_3)$alkyl, $(C_6\text{-}C_{10})$aryloxy, $(C_5\text{-}C_{10})$heteroaryloxy, $(C_1\text{-}C_6)$acyloxy; and where for repeat unit B, $R_1$, $R_2$, $R_3$ and $R_4$ are the same or different and each independently of one another is selected from hydrogen, linear or branched $(C_1\text{-}C_{16})$alkyl, perfluoro$(C_1\text{-}C_{12})$alkyl, $(C_3\text{-}C_{12})$cycloalkyl, $(C_6\text{-}C_{12})$bicycloalkyl, $(C_7\text{-}C_{14})$tricycloalkyl, $(C_6\text{-}C_{10})$aryl, $(C_6\text{-}C_{10})$aryl$(C_1\text{-}C_3)$alkyl, perfluoro$(C_6\text{-}C_{10})$aryl, perfluoro$(C_6\text{-}C_{10})$aryl$(C_1\text{-}C_3)$alkyl, $(C_1\text{-}C_{12})$alkoxy, $(C_3\text{-}C_{12})$cycloalkoxy, $(C_6\text{-}C_{12})$bicycloalkoxy, $(C_7\text{-}C_{14})$tricycloalkoxy, $(C_6\text{-}C_{10})$aryloxy$(C_1\text{-}C_3)$alkyl and $(C_6\text{-}C_{10})$aryloxy.

In another aspect of this invention there is also provided a membrane and antireflective coatings formed from a nanoporous film formed from a block polymer of formula (I) as described herein.

BRIEF DESCRIPTION OF THE DRAWINGS

Embodiments in accordance with the present invention are described below with reference to the following accompanying figures and/or images. Where drawings are provided, it will be drawings which are simplified portions of various embodiments of this invention and are provided for illustrative purposes only.

DETAILED DESCRIPTION

Figure 1:
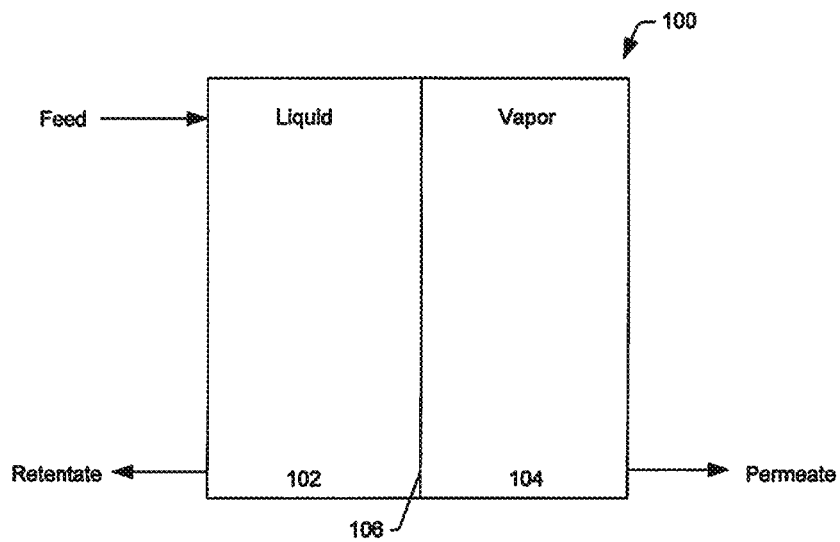
FIG. 1 depicts a pervaporation module in accordance with embodiments of the invention.

The terms as used herein have the following meanings:

As used herein, the articles "a," "an," and "the" include plural referents unless otherwise expressly and unequivocally limited to one referent.

Since all numbers, values and/or expressions referring to quantities of ingredients, reaction conditions, etc., used herein and in the claims appended hereto, are subject to the various uncertainties of measurement encountered in obtaining such values, unless otherwise indicated, all are to be understood as modified in all instances by the term "about."

Where a numerical range is disclosed herein such range is continuous, inclusive of both the minimum and maximum values of the range as well as every value between such minimum and maximum values. Still further, where a range refers to integers, every integer between the minimum and maximum values of such range is included. In addition, where multiple ranges are provided to describe a feature or characteristic, such ranges can be combined. That is to say that, unless otherwise indicated, all ranges disclosed herein are to be understood to encompass any and all sub-ranges subsumed therein. For example, a stated range of from "1 to 10" should be considered to include any and all sub-ranges between the minimum value of 1 and the maximum value of 10. Exemplary sub-ranges of the range 1 to 10 include, but are not limited to, 1 to 6.1, 3.5 to 7.8, and 5.5 to 10, etc.

As used herein, the symbol "〰" denotes a position at which the bonding takes place with another repeat unit or another atom or molecule or group or moiety as appropriate with the structure of the group as shown.

As used herein, "hydrocarbyl" refers to a radical of a group that contains carbon and hydrogen atoms, non-limiting examples being alkyl, cycloalkyl, aryl, aralkyl, alkaryl, and alkenyl. Derived expressions of "hydrocarbyl" should be construed accordingly. For example, the term "halohydrocarbyl" refers to a hydrocarbyl group where at least one hydrogen has been replaced by a halogen. Another derived term "perhalocarbyl" refers to a hydrocarbyl group where all hydrogens have been replaced by a halogen.

As used herein, the expression "$(C_1-C_6)$alkyl" includes methyl and ethyl groups, and straight-chained or branched propyl, butyl, pentyl and hexyl groups. Particular alkyl groups are methyl, ethyl, n-propyl, isopropyl and tert-butyl. Derived expressions such as "$(C_1-C_4)$alkoxy", "$(C_1-C_4)$thioalkyl", "$(C_1-C_4)$alkoxy$(C_1-C_4)$alkyl", "hydroxy$(C_1-C_4)$alkyl", "$(C_1-C_4)$alkyl-carbonyl", "$(C_1-C_4)$alkoxycarbonyl$(C_1-C_4)$alkyl", "$(C_1-C_4)$alkoxycarbonyl", "amino$(C_1-C_4)$alkyl", "$(C_1-C_4)$alkylamino", "$(C_1-C_4)$alkylcarbamoyl$(C_1-C_4)$alkyl", "$(C_1-C_4)$dialkyl-carbamoyl$(C_1-C_4)$alkyl" "mono- or di-$(C_1-C_4)$alkylamino$(C_1-C_4)$alkyl", "amino$(C_1-C_4)$alkyl-carbonyl", "diphenyl$(C_1-C_4)$alkyl", "phenyl$(C_1-C_4)$alkyl", "phenylcarboyl$(C_1-C_4)$alkyl" and "phenoxy$(C_1-C_4)$alkyl" are to be construed accordingly.

As used herein, the expression "cycloalkyl" includes all of the known cyclic radicals. Representative examples of "cycloalkyl" includes without any limitation cyclopropyl, cyclobutyl, cyclopentyl, cyclohexyl, cycloheptyl, cyclooctyl, and the like. Derived expressions such as "cycloalkoxy", "cycloalkylalkyl", "cycloalkylaryl", "cycloalkylcarbonyl" are to be construed accordingly.

As used herein, the expression "$(C_2-C_6)$alkenyl" includes ethenyl and straight-chained or branched propenyl, butenyl, pentenyl and hexenyl groups. Similarly, the expression "$(C_2-C_6)$alkynyl" includes ethynyl and propynyl, and straight-chained or branched butynyl, pentynyl and hexynyl groups.

As used herein the expression "$(C_1-C_4)$acyl" shall have the same meaning as "$(C_1-C_4)$alkanoyl", which can also be represented structurally as "R—CO—," where R is a $(C_1-C_3)$alkyl as defined herein. Additionally, "$(C_1-C_3)$alkylcarbonyl" shall mean same as $(C_1-C_4)$acyl. Specifically, "$(C_1-C_4)$acyl" shall mean formyl, acetyl or ethanoyl, propanoyl, n-butanoyl, etc. Derived expressions such as "$(C_1-C_4)$acyloxy" and "$(C_1-C_4)$acyloxyalkyl" are to be construed accordingly.

As used herein, the expression "$(C_1-C_6)$perfluoroalkyl" means that all of the hydrogen atoms in said alkyl group are replaced with fluorine atoms. Illustrative examples include trifluoromethyl and pentafluoroethyl, and straight-chained or branched heptafluoropropyl, nonafluorobutyl, undecafluoropentyl and tridecafluorohexyl groups. Derived expression, "$(C_1-C_6)$perfluoroalkoxy", is to be construed accordingly.

As used herein, the expression "$(C_6-C_{10})$aryl" means substituted or unsubstituted phenyl or naphthyl. Specific examples of substituted phenyl or naphthyl include o-, p-, m-tolyl, 1,2-, 1,3-, 1,4-xylyl, 1-methylnaphthyl, 2-methylnaphthyl, etc. "Substituted phenyl" or "substituted naphthyl" also include any of the possible substituents as further defined herein or one known in the art. Derived expression, "$(C_6-C_{10})$arylsulfonyl," is to be construed accordingly.

As used herein, the expression "$(C_6-C_{10})$aryl$(C_1-C_4)$alkyl" means that the $(C_6-C_{10})$aryl as defined herein is further attached to $(C_1-C_4)$alkyl as defined herein. Representative examples include benzyl, phenylethyl, 2-phenylpropyl, 1-naphthylmethyl, 2-naphthylmethyl and the like. It should be further noted that the expressions "arylalkyl" and "aralkyl" mean the same are used interchangeably. Accordingly, the expression "$(C_6-C_{10})$aryl$(C_1-C_4)$alkyl" can also be construed as "$(C_6-C_{14})$aralkyl."

As used herein, the expression "heteroaryl" includes all of the known heteroatom containing aromatic radicals. Representative 5-membered heteroaryl radicals include furanyl, thienyl or thiophenyl, pyrrolyl, isopyrrolyl, pyrazolyl, imidazolyl, oxazolyl, thiazolyl, isothiazolyl, and the like. Representative 6-membered heteroaryl radicals include pyridinyl, pyridazinyl, pyrimidinyl, pyrazinyl, triazinyl, and the like radicals. Representative examples of bicyclic heteroaryl radicals include, benzofuranyl, benzothiophenyl, indolyl, quinolinyl, isoquinolinyl, cinnolyl, benzimidazolyl, indazolyl, pyridofuranyl, pyridothienyl, and the like radicals.

As used herein, the expression "heterocycle" includes all of the known reduced heteroatom containing cyclic radicals. Representative 5-membered heterocycle radicals include tetrahydrofuranyl, tetrahydrothiophenyl, pyrrolidinyl, 2-thiazolinyl, tetrahydrothiazolyl, tetrahydrooxazolyl, and the like. Representative 6-membered heterocycle radicals include piperidinyl, piperazinyl, morpholinyl, thiomorpholinyl, and the like. Various other heterocycle radicals include, without limitation, aziridinyl, azepanyl, diazepanyl, diazabicyclo[2.2.1]hept-2-yl, and triazocanyl, and the like.

"Halogen" or "halo" means chloro, fluoro, bromo, and iodo.

In a broad sense, the term "substituted" is contemplated to include all permissible substituents of organic compounds. In a few of the specific embodiments as disclosed herein, the term "substituted" means substituted with one or more substituents independently selected from the group consisting of $C_{1-6}$alkyl, $C_{2-6}$alkenyl, $C_{1-6}$perfluoroalkyl, phenyl, hydroxy, —$CO_2H$, an ester, an amide, $C_1-C_6$alkoxy, $C_1-C_6$thioalkyl, $C_1-C_6$perfluoroalkoxy, —$NH_2$, Cl, Br, I, F, —NH-lower alkyl, and —N(lower alkyl)$_2$. However, any of the other suitable substituents known to one skilled in the art can also be used in these embodiments.

It should be noted that any atom with unsatisfied valences in the text, schemes, examples and tables herein is assumed to have the appropriate number of hydrogen atom(s) to satisfy such valences.

As used herein the term, "living polymerization" means that a chain growth polymerization where the ability of a growing polymer chain to terminate has been removed. That is to say, in this system both chain termination and chain transfer reaction are absent and the rate of chain initiation is also much larger than the rate of chain propagation, which results in growth of polymer chains at a more constant rate than seen in traditional chain polymerization and their lengths remain very similar (i.e., they have a very low polydispersity index, PDI).

As used herein the terms, "block copolymer" or "block polymer" are used interchangeably and mean the same, that is, two or more homopolymer subunits are linked by covalent bonds. Accordingly, "diblock copolymer" can be represented by -(A)$_a$-b-(B)$_b$-, where a homopolymer of formula A is linked by a single bond with a homopolymer of formula B, and a and b are respective numbers of monomer repeat units. Thus, in this "diblock copolymer" representation "b" denotes a "block" of preceding homopolymer (A)$_a$ is linked by a covalent bond with a succeeding homopolymer (B)$_b$. Accordingly, the designation "-b-" should be construed as a bond between the designated polymeric blocks. Similarly, "triblock copolymer," "tetrablock copolymer," and so on, should be construed accordingly. Further, "diblock copolymer" or "diblock polymer" are used interchangeably.

As used herein, the terms "polymer composition," "copolymer composition," "terpolymer composition" or "tetrapolymer composition" are used herein interchangeably and are meant to include at least one synthesized polymer, copolymer terpolymer or tetrapolymer, as well as residues from initiators, solvents or other elements attendant to the synthesis of such polymers, where such residues are understood as not necessarily being covalently incorporated thereto. But some catalysts or initiators may sometimes be covalently bound to a part of the polymeric chain either at the beginning and/or end of the polymeric chain. Such residues and other elements considered as part of the "polymer" or "polymer composition" are typically mixed or co-mingled with the polymer such that they tend to remain therewith when it is transferred between vessels or between solvent or dispersion media. A polymer composition can also include materials added after synthesis of the polymer to provide or modify specific properties of such composition. Such materials include, but are not limited to solvent(s), antioxidant(s), photoinitiator(s), sensitizers and other materials as will be discussed more fully below.

By the term, "a monomer repeat unit is derived" is meant that the polymeric repeating units are polymerized (formed) from, e.g., polycyclic norbornene-type monomers, wherein the resulting polymers are formed by 2,3 enchainment of norbornene-type monomers as shown below:

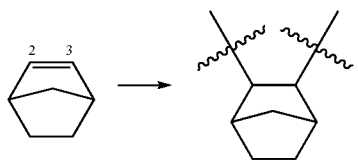

Block Polymers

Advantageously, it has now been found that various block polymers encompassing one or more distinctive norbornene type compounds of formula (I) as described herein are useful in the formation of nanoporous films of this invention. The block polymers as described herein can be prepared by any of the known methods in the art. For example, see copending patent application, U.S. Provisional Application No. 62/037,809, filed Aug. 15, 2014, pertinent portions of which is incorporated herein by reference. It has further been found that the nanoporous films formed from the block copolymers of this invention exhibit unique morphologies and therefore find utility in a variety of applications including but not limited to forming membrane materials, antireflection materials and in various other optical and electronic applications, among others. The membranes formed from the block copolymers are useful for example in separation of organics from biomass or other organic wastes as further described herein.

Accordingly, there is provided a nanoporous film comprising a diblock polymer of the formula (I):

$$(A)_a\text{-}b\text{-}(B)_c \quad (I);$$

where a and c are integers of at least 15;

b denotes a bond;

A and B are different from each other and independently selected from a repeat unit represented by formula (IIA), said repeat unit is derived from a monomer of formula (II):

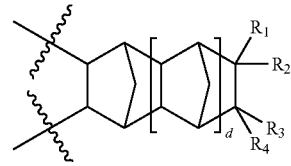

(IIA)

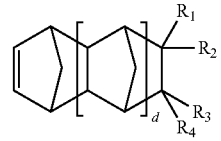

(II)

wherein:

∿∿ denotes a place of bonding with another repeat unit;

d is an integer 0, 1 or 2;

where for repeat unit A, at least one of $R_1$, $R_2$, $R_3$ and $R_4$ is selected from the group consisting of formulae D, E, F, G and H:

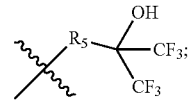

D

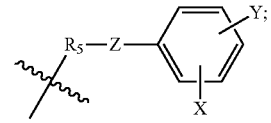

E

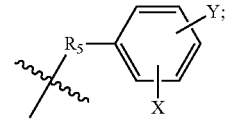

F

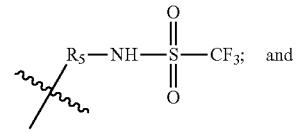

G

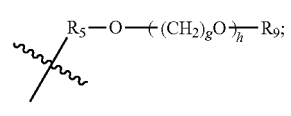

H where g and h are integers from 1 to 4;

$R_5$ is a bond or $(C_1\text{-}C_6)$alkylene or $(C_1\text{-}C_4)$alkylene-O—$(C_1\text{-}C_4)$alkylene, where said one or more alkylene groups are further substituted with substituted or unsubstituted $(C_1\text{-}C_6)$alkyl, $(C_6\text{-}C_{10})$aryl or $(C_6\text{-}C_{10})$aryl$(C_1\text{-}C_3)$alkyl;

$R_9$ is $(C_1\text{-}C_{16})$alkyl;

X is hydroxy or $(C_1\text{-}C_4)$alkanoyl;

Y is hydrogen, linear or branched $(C_1-C_{16})$alkyl, $(C_6-C_{10})$aryl$(C_1-C_3)$alkyl, linear or branched $(C_1-C_{16})$alkoxy or $(C_6-C_{10})$aryl$(C_1-C_3)$alkoxy; and Z is

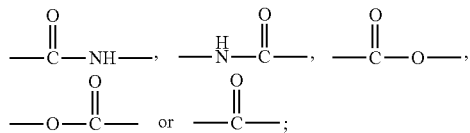

the remaining $R_1$, $R_2$, $R_3$ and $R_4$ are the same or different and each independently of one another is selected from hydrogen, linear or branched $(C_1-C_{16})$alkyl, hydroxy$(C_1-C_{16})$alkyl, perfluoro$(C_1-C_{12})$alkyl, $(C_3-C_{12})$cycloalkyl, $(C_6-C_{12})$bicycloalkyl, $(C_7-C_{14})$tricycloalkyl, $(C_6-C_{10})$aryl, $(C_6-C_{10})$aryl$(C_1-C_3)$alkyl, perfluoro$(C_6-C_{10})$aryl, perfluoro$(C_6-C_{10})$aryl$(C_1-C_3)$alkyl, hydroxy, $(C_1-C_{12})$alkoxy, $(C_3-C_{12})$cycloalkoxy, $(C_6-C_{12})$bicycloalkoxy, $(C_7-C_{14})$tricycloalkoxy, $(C_6-C_{10})$aryloxy$(C_1-C_3)$alkyl, $(C_5-C_{10})$heteroaryloxy$(C_1-C_3)$alkyl, $(C_6-C_{10})$aryloxy, $(C_5-C_{10})$heteroaryloxy, $(C_1-C_6)$acyloxy; and where for repeat unit B, $R_1$, $R_2$, $R_3$ and $R_4$ are the same or different and each independently of one another is selected from hydrogen, linear or branched $(C_1-C_{16})$alkyl, perfluoro$(C_1-C_{12})$alkyl, $(C_3-C_2)$cycloalkyl, $(C_6-C_{12})$bicycloalkyl, $(C_7-C_{14})$tricycloalkyl, $(C_6-C_{10})$aryl, $(C_6-C_{10})$aryl $(C_1-C_3)$alkyl, perfluoro$(C_6-C_{10})$aryl, perfluoro$(C_6-C_{10})$aryl-$(C_1-C_3)$alkyl, $(C_1-C_{12})$alkoxy, $(C_3-C_{12})$cycloalkoxy, $(C_6-C_{12})$bicycloalkoxy, $(C_7-C_{14})$tricycloalkoxy, $(C_6-C_{10})$aryloxy$(C_1-C_3)$alkyl and $(C_6-C_{10})$aryloxy.

Advantageously, it has now been found that employing different types of functionalized norbornene monomers of formula (II) it is now possible to make block polymers which can form nanoporous films of this invention. Thus, for instance, in some embodiments, the repeat units employed to make block A of block polymer of formula (I) can be "alcoholphilic" and the repeat units of block B of block polymer of formula (I) can be hydrophobic to form nanoporous films of this invention. The term "alcoholphilic" as used herein shall have the conventional meaning as used in the art. That is, the involved blocks or molecules are either soluble in alcohol solvents and/or have affinity towards alcohol, thus may swell more readily when exposed to alcohols. Similarly, the term "hydrophobic" as used herein shall have the generally accepted meaning in the art. That is, the blocks which are hydrophobic are generally non-polar and repels with water.

Accordingly, the repeat units A of block polymer of formula (I) are generally derived from norbornene monomers of formula (II) which contains one or more polar substituent groups rendering them more soluble in alcohol or have affinity towards alcohols. Thus, any of the known substituents which renders norbornene more soluble in alcohol, such as for example, butanol, can be used as monomer A to form the block polymer of formula (I). Representative examples of such monomers which can be used as A, without any limitation, are enumerated as follows:

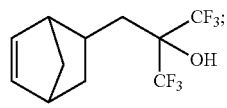

norbornenyl-2-trifluoromethyl-3,3,3-trifluoropropan-2-ol (HFANB)

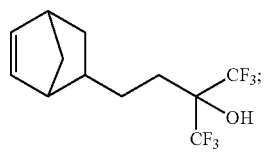

4-(bicyclo[2.2.1]hept-5-en-2-yl)-1,1,1-trifluoro-2-(trifluoromethyl)butan-2-ol (HFACH₂NB)

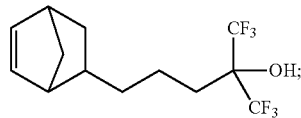

5-(bicyclo[2.2.1]hept-5-en-2-yl)-1,1,1-trifluoro-2-(trifluoromethyl)pentan-2-ol (HFACH₂CH₂NB)

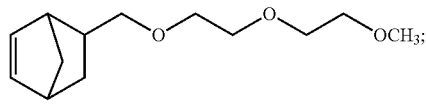

5-((2-(2-methoxyethoxy)ethoxy)methyl)bicyclo[2.2.1]hept-2-ene (NBTON)

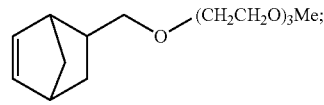

1-(bicyclo[2.2.1]hept-5-en-2-yl)-2,5,8,11-tetraoxadodecane (NBTODD)

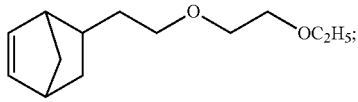

5-(2-(2-ethoxyethoxy)ethyl)bicyclo[2.2.1]hept-2-ene

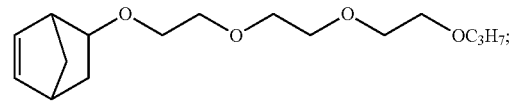

5-(2-(2-(2-propoxyethoxy)ethoxy)ethoxy)bicyclo[2.3.1]hept-2-ene

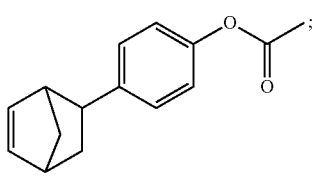

4-(bicyclo[2.2.1]hept-5-en-2-yl)phenyl acetate

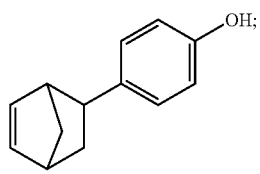

4-(bicyclo[2.2.1]hept-5-en-2-yl)phenol

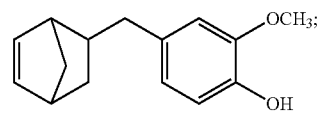

4-(bicyclo[2.2.1]hept-4-en-2-ylmethyl)-2-methoxyphenol

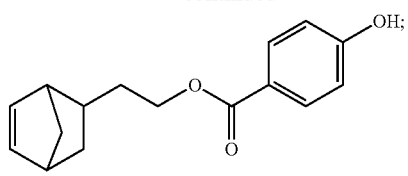

2-(bicyclo[2.2.1]hept-5-en-2-yl)ethyl 4-hydroxybenzoate

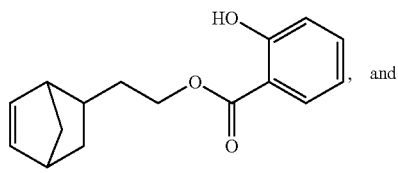, and 2-(bicyclo[2.2.1]hept-5-en-2-yl)ethyl 2-hydroxybenzoate

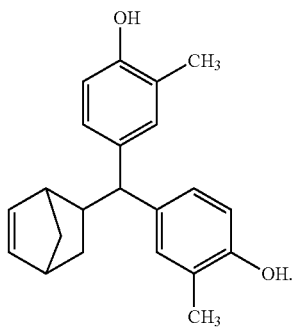

4,4¢-(bicyclo[2.2.1]hept-5-en-2-ylmethylene)bis(2-methylphenol)

Further in accordance with this aspect of the invention, the repeat units B of block polymer of formula (I) are generally derived from norbornene monomers of formula (II) which can contain one or more non-polar substituent groups rendering them hydrophobic. Thus, any of the known substituents which renders norbornene repeat units hydrophobic can be used as monomer B to form the block polymer of formula (I). An example of such monomer being norbornene itself. Other representative examples of such monomers which can be used as monomer B, without any limitation, are enumerated as follows:

bicyclo[2.2.1]hept-2-ene (NB)

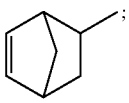

5-methylbicyclo[2.2.1]hept-2-ene (MeNB)

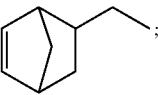

5-ethylbicyclo[2.2.1]hept-2-ene (EtNB)

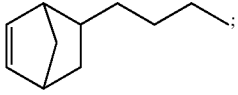

5-n-butylbicyclo[2.2.1]hept-2-ene (BuNB)

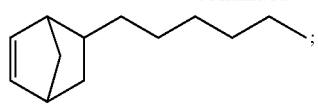

5-hexylbicyclo[2.2.1]hept-2-ene (HexNB)

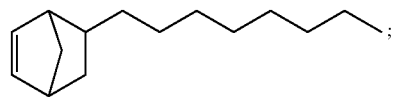

5-octylbicyclo[2.2.1]hept-2-ene (OctNB)

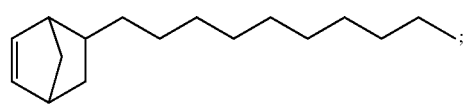

5-decylbicyclo[2.2.1]hept-2-ene (DecNB)

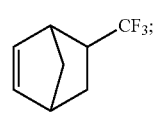

5-trifluoromethylbicyclo[2.2.1]hept-2-ene ($CF_3NB$)

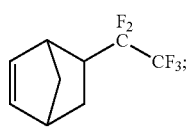

5-perfluoroethylbicyclo[2.2.1]hept-2-ene ($C_2F_5NB$)

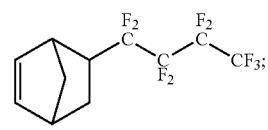

5-n-perfluorobutylbicyclo[2.2.1]hept-2-ene ($C_4F_9NB$)

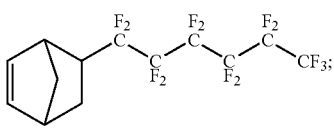

5-perfluorohexylbicyclo[2.2.1]hept-2-ene ($C_6F_{13}NB$)

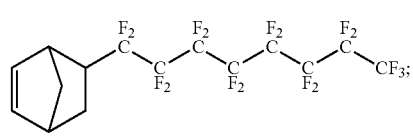

5-perfluorooctylbicyclo[2.2.1]hept-2-ene (OctNB)

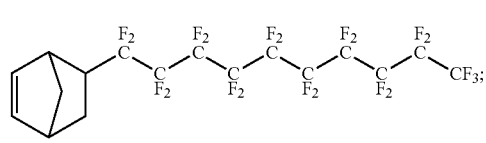

5-perfluorodecylbicyclo[2.2.1]hept-2-ene (DecNB)

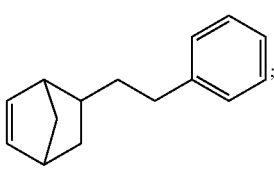

5-phenethylbicyclo[2.2.1]hept-2-ene (PENB)

-continued

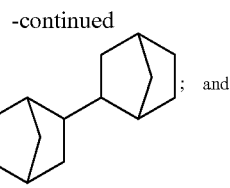

2-bicyclo[2.2.1]hept-5-en-2-yl)bicyclo[2.2.1]heptane (also referred to herein as NBANB)

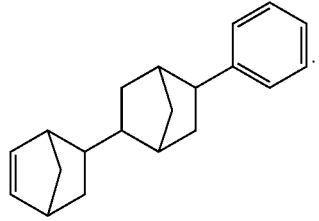

2-bicyclo[2.2.1]hept-5-en-2-yl)phenyl-bicyclo[2.2.1]heptane (also referred to herein as NBNBAPh)

It should however be noted that in some embodiments it is possible to use different types of monomers within the same groups of monomers A and B to form block polymers which provide different solubility properties in different solvents such that they can be used to form nanoporous films of this invention. That is for example perfluoroalkyl substituted norbornenes typically exhibit different solubility characteristics in different solvents when compared with the corresponding alkylnorbornenes. Therefore, a block polymer made from a suitable alkylnorbornene and a perfluoroalkylnorbornene will exhibit different solubility contrast in different solvents and may exhibit different swelling effects of each of the blocks. Accordingly, such block polymers can also be used to form nanoporous films of this invention by selective solvent swelling and subsequent solvent extraction using a different solvent, such as for example, water. For instance, a block polymer of BuNB and $C_4F_9NB$ may be suitable to form nanoporous films utilizing appropriate combination of solvents. Accordingly, all such combinations of block polymers are also within the scope of this invention.

It should further be noted that any other physical form of the block polymer as described herein can also be used to form the respective high porosity nanoporous form of such polymeric material. Such other physical forms of the block polymer can include without any limitation fiber, non-woven mats or fabrics, sheets, melt presses films, and the like. Such forms of the block polymer can be formed by any of the methods known in the art. For example, the films as disclosed herein are shown to be formed by solution casting of the block polymer. However, any other method to form the films including but not limited to melt pressing to form thin films, or drawing film from suitable viscosity polymeric solution and/or from molten polymer at higher temperature, extruded films, molded films, including injection molding, compression molding, and the like can be employed. Similarly, the block polymers as disclosed herein can also be fabricated into fibers by any of the methods known in the art, such as for example, melt spinning and/or solution spinning as well as electrospinning. All such forms are within the scope of this invention.

In a electrospinning method, the polymer is dissolved in appropriate solvent (for example toluene/THF) to desired concentration (typically 1-25 wt. %), then the polymer solution is placed in a suitable container equipped with a pressure controller and an outlet through a metal needle. A sufficient potential (voltage) is placed between the needle and a collector, such as aluminum foil. The pressure on the solution, including vacuum or atmospheric pressure, can be controlled to regulate the speed at which the solution escapes the container. The distance between the needle and collector is sufficient to allow for the solvent to evaporate (or not fully to enable 'welding' of the fibers where they cross). This spinning process continues until the mat is sufficiently thick. Various other electrospinning techniques are known in the art, such as roll to roll, continuous spinning on rotating drum for forming for example long continuous fibers. Accordingly, depending on the method employed mats as non-wovens or fibers can be formed, which can further be employed in this invention to form high porosity materials in their respective forms.

The melt pressed films can also be formed using any of the techniques known to one skilled in the art. A typical melt pressing process includes heating the polymer to a temperature above its crystallization and/or glass transition temperature. Then force is applied to the molten polymer to induce flow to flatten or form a desired mold shape, and then the polymer is cooled to below its solidification temperature to form the melt pressed film.

Finally, an extruded film or sheet can be formed by melting the polymer via heat and mechanical shear using a screw (a single or a twin screw). This can include multiple heating zones and different zones on the screw. The melted polymer is forced through a die to form the desired shape, such as a film. The film can optionally be stretched after exiting the die to induce orientation and decrease the thickness. The extruded polymer is cooled to below its solidification temperature.

Accordingly, the block polymer as disclosed herein formed into various other forms can then be used to form the high porosity nanoporous shaped materials by immersing in appropriate alcohol solvents and then in water as described hereafter. It should further be noted that by controlling the time in the solvent the porosity of shaped articles can be tuned as again described in detail hereafter.

In some embodiments of this invention, the film encompasses a block polymer which is a triblock polymer of formula (III):

$$(A)_a\text{-}b\text{-}(B)_c\text{-}b\text{-}(A)_e \quad (III);$$

where a, b, c, A and B are as defined above, and e is an integer of at least 15.

In some other embodiments of this invention the film encompasses a block polymer, which is a triblock polymer of formula (IV):

$$(A)_a\text{-}b\text{-}(B)_c\text{-}b\text{-}(C)_f \quad (IV);$$

where a, b, c, A and B are as defined herein and f is an integer of at least 15. In this aspect of the invention, C is different from A or B and independently selected from a repeat unit represented by formula (IIA), said repeat unit is derived from a monomer of formula (II) wherein at least one of $R_1$, $R_2$, $R_3$ and $R_4$ is selected from the group consisting of formulae I, J, K, L, M, N and O:

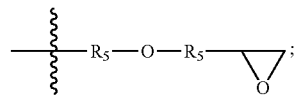

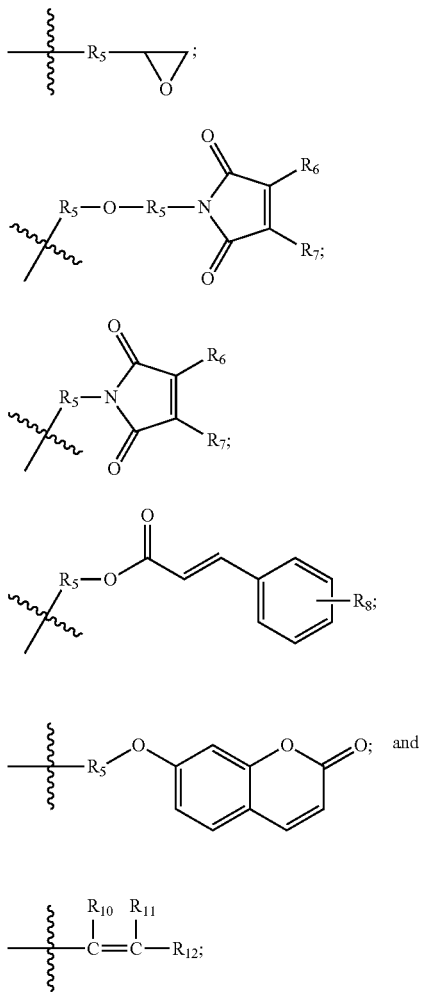

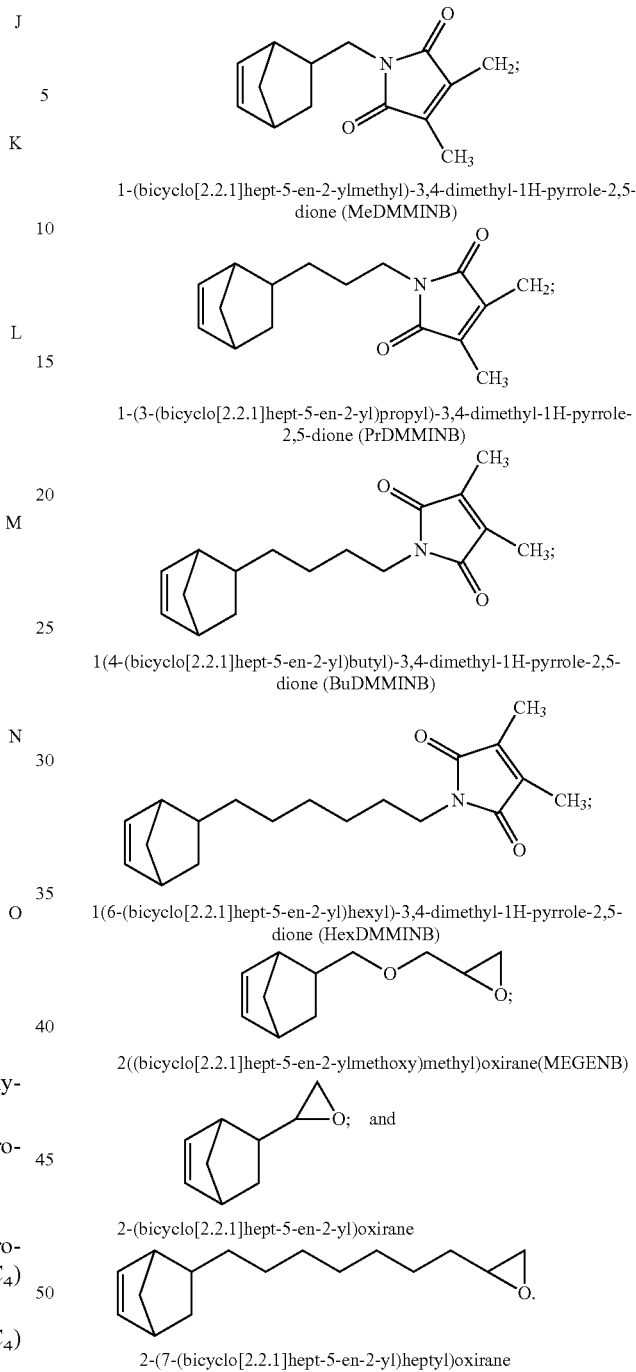

where $R_5$ is a bond or $(C_1-C_6)$alkylene or $(C_1-C_4)$alkylene-O—$(C_1-C_4)$alkylene;

$R_6$ and $R_7$ are each independently of one another hydrogen or $(C_1-C_4)$alkyl; and $R_8$ is hydrogen, $(C_1-C_4)$alkyl or $(C_1-C_4)$alkoxy;

$R_{10}$ and $R_{11}$ are each independently of one another hydrogen, $(C_1-C_4)$alkyl, $(C_6-C_{10})$aryl or $(C_6-C_{10})$aryl$(C_1-C_4)$alkyl;

$R_{12}$ is —CN, —$CO_2R_{13}$, where $R_{13}$ is hydrogen, $(C_1-C_4)$alkyl, $(C_6-C_{10})$aryl or $(C_6-C_{10})$aryl$(C_1-C_4)$alkyl; and each of the remaining $R_1$, $R_2$, $R_3$ and $R_4$ is hydrogen.

Further in accordance with this aspect of the invention, the repeat units C of block polymer of formula (IV) are generally derived from norbornene monomers of formula (II) which can contain one or more cross-linkable groups, as delineated above by way of functional groups I through O. However, any of the other known substituents which can be used for cross-linking under suitable conditions can also be used with monomer C to form the block polymer of formula (IV). Representative examples of such monomers which can be used as monomer C, without any limitation, are enumerated as follows:

In certain embodiments a, c, e and f independently of each other can range from 20 to 4000, or from 50 to 3000 or 100 to 2000, and in other embodiments each of a, c, e and f can also be higher than 4000 depending upon the intended use of the block polymer. As noted, A, B and C are independently selected from a repeat unit represented by formula (IIA), said repeat unit is derived from a monomer of formula (II) as defined herein. That is to say that the block copolymers of this invention can exist as di-blocks or as tri-blocks. However, any number of additional blocks can be formed by adding one or more other monomers of formula (II) to form multi-block copolymers of this invention. For example, the di-block polymers are typically formed by first polymerizing the first monomer of formula (II) in the presence of a suitable catalyst under living polymerization conditions, and then a second distinctive monomer can be added to the same polymerization reaction mixture to form the di-block copolymer. In general, the polymerization is carried out in solution at a suitable polymerization reaction temperature using any of the methods known in the art. Such polymerization methods are reported in the copending patent application, U.S. Provisional Application No. 62/037,809, filed Aug. 15, 2014.

In certain embodiments of this invention, the triblock polymers of formula (IV) can also be a random block polymer in which blocks of repeat units A is polymerized with a random block of B and C repeat units, resulting in a random block polymer of formula (V):

Where A, B, C, a, b and c are as defined above. In this aspect of the invention, monomer repeat units A are first polymerized using the living polymerization conditions as described above and then desirable amounts of monomer repeat units B and C are added together to the polymerization mixture and continued to polymerize to obtain the random block polymer of formula (V). The polymer thus formed will have a statistical distribution of monomers B and C with a block polymer of monomer A. Any of the mole ratios (or weight ratios) of A and B in a diblock polymer, and any of the mole ratios of A, B and C in a triblock or random block polymer can be employed to form a block polymer of this invention which can be formed into a nanoporous film of this invention.

Accordingly, in some embodiments, there is provided a diblock copolymer, wherein the block molar ratio of A:B is from 1:1 to 1:4. In another embodiment, the block molar ratio of A:B is from 1:1 to 1:2. In yet another embodiment, the block molar ratio of A:B is 1:1. In yet another embodiment the block polymer is a triblock polymer, wherein the block molar ratio of A:B:C is from 1:1:1 to 1:4:1 to 1:1:4. In a further embodiment, block molar ratio of A:B:C is 1:1:1; and in another embodiment the block molar ratio of A:B:C is 1:2:1.

In certain embodiments there is also provided diblock polymers of formula (I) as described herein; and triblock polymers of formulae (III), (IV) or (V) as described herein.

Non-limiting examples of the block polymer to form the films of this invention is selected from the group consisting of:

a diblock polymer derived from 5-hexylbicyclo[2.2.1]hept-2-ene and norbornenyl-2-trifluoromethyl-3,3,3-trifluoropropan-2-ol (HexNB-b-HFANB);

a diblock polymer derived from 5-butylbicyclo[2.2.1]hept-2-ene and norbornenyl-2-trifluoromethyl-3,3,3-trifluoropropan-2-ol (BuNB-b-HFANB);

a diblock polymer derived from 5-butylbicyclo[2.2.1]hept-2-ene and 1-(4-(bicyclo[2.2.1]hept-5-en-2-yl)butyl)-3,4-dimethyl-1H-pyrrole-2,5-dione (C₄F₉NB-b-BuDMMINB);

a diblock polymer derived from 5-decylbicyclo[2.2.1]hept-2-ene and norbornenyl-2-trifluoromethyl-3,3,3-trifluoropropan-2-ol (DecNB-b-HFANB); and a diblock polymer derived from norbornenyl-2-trifluoromethyl-3,3,3-trifluoropropan-2-ol and 2-(bicyclo[2.2.1]hept-5-en-2-yl)bicyclo[2.2.1]heptane (HFANB-b-NBANB).

In some other embodiments, the block polymer to form the films of this invention is selected from the group consisting of:

a triblock polymer derived from norbornenyl-2-trifluoromethyl-3,3,3-trifluoropropan-2-ol, 5-decylbicyclo[2.2.1]hept-2-ene and norbornenyl-2-trifluoromethyl-3,3,3-trifluoropropan-2-ol (HFANB-b-DecNB-b-HFANB); and a triblock polymer derived from norbornenyl-2-trifluoromethyl-3,3,3-trifluoropropan-2-ol, 5-butylbicyclo[2.2.1]hept-2-ene and norbornenyl-2-trifluoromethyl-3,3,3-trifluoropropan-2-ol (HFANB-b-BuNB-b-HFANB).

In some other embodiments, the block polymer to form the films of this invention is selected from the group consisting of:

a triblock polymer derived from norbornenyl-2-trifluoromethyl-3,3,3-trifluoropropan-2-ol, 5-octylbicyclo[2.2.1]hept-2-ene, and 1-(4-(bicyclo[2.2.1]hept-5-en-2-yl)butyl)-3,4-dimethyl-1H-pyrrole-2,5-dione (HFANB-b-OctNB-b-BuDMMINB); and a triblock polymer derived from norbornenyl-2-trifluoromethyl-3,3,3-trifluoropropan-2-ol, 5-butylbicyclo[2.2.1]hept-2-ene, and 1-(4-(bicyclo[2.2.1]hept-5-en-2-yl)butyl)-3,4-dimethyl-1H-pyrrole-2,5-dione (HFANB-b-BuNB-b-BuDMMINB).

As noted, in certain other embodiments, the block polymer to form the films of this invention can be a polymer of formula (V), non-limiting examples of which are listed below:

a block polymer derived from norbornenyl-2-trifluoromethyl-3,3,3-trifluoropropan-2-ol, with random repeat units derived from monomers, 5-decylbicyclo[2.2.1]hept-2-ene and norbornenyl-2-trifluoromethyl-3,3,3-trifluoropropan-2-ol (HFANB-b-RCP-(DecNB-HFANB), where RCP indicates random copolymer having statistical distribution of the monomers specified therein;

a block polymer derived from norbornenyl-2-trifluoromethyl-3,3,3-trifluoropropan-2-ol, with random repeat units derived from monomers, 5-octylbicyclo[2.2.1]hept-2-ene, and 1-(4-(bicyclo[2.2.1]hept-5-en-2-yl)butyl)-3,4-dimethyl-1H-pyrrole-2,5-dione (HFANB-b-RCP(OctNB-BuDMMINB); and a block polymer derived from norbornenyl-2-trifluoromethyl-3,3,3-trifluoropropan-2-ol, with random repeat units derived from monomers, 5-butylbicyclo[2.2.1]hept-2-ene, and 1-(4-(bicyclo[2.2.1]hept-5-en-2-yl)butyl)-3,4-dimethyl-1H-pyrrole-2,5-dione (HFANB-b-RCP-(BuNB-BuDMMINB).

As noted above, the block polymers of this invention can be prepared by any of the procedures known in the art. In general, the polymerization is carried out in solution and in the presence of a suitable metal catalyst. In some embodiments of this invention it has been advantageously found that a metal catalyst in combination with a suitable compound, which may function as co-catalyst, initiator or pro-initiator or activator, offers a way to make the block polymers of this invention. However, as noted, any of the other approaches known in the art can also be employed.

Thus it should be noted that the palladium containing catalysts useful for making the block copolymers of this invention can be prepared as a preformed single component catalyst or prepared in situ by admixing a palladium containing procatalyst with an activator (or a cocatalyst, initiator or pro-initiator, as mentioned above) in the presence of the desired monomer(s) to be polymerized.

Accordingly, the preformed catalyst can be prepared by admixing the catalyst precursors such as a procatalyst and activator (or a cocatalyst, initiator or pro-initiator) in an appropriate solvent, allowing the reaction to proceed under appropriate temperature conditions, and isolating the reaction product, that is, a preformed catalyst product. By procatalyst is meant a palladium containing compound that is converted to an active catalyst by reaction with a cocatalyst, activator, initiator, pro-initiator compound. Further description and synthesis of representative procatalysts and activator compounds can be found in U.S. Pat. No. 6,455,650, pertinent portions of which are incorporated herein by reference.

The block copolymers formed according to this invention generally exhibit a number average molecular weight ($M_n$) of at least about 2,000 grams/mole for each of the blocks formed. The $M_n$ of each of the blocks can be tailored to a desirable property and based on the end use of the block copolymer. Thus, in another embodiment, one of the blocks of the block copolymer of this invention has a $M_n$ of at least about 20,000 grams/mole. In yet another embodiment, one of the blocks of the block copolymer of this invention has a $M_n$ of at least about 50,000 grams/mole. In some other embodiments, one of the blocks of the block copolymer of this invention has a $M_n$ of at least about 100,000 grams/mole. In another embodiment, one block of a diblock copolymer has a $M_n$ of at least 5,000 grams/mole and the other block has a $M_n$ of at least 20,000 grams/mole. In some other embodiments, any one of the blocks of the block polymers of this invention has a $M_n$ of higher than 100,000 grams/mole, higher than 200,000 grams/mole or higher than 500,000 grams/mole. The number average molecular weight ($M_n$) of the block copolymers can be determined by any of the known techniques, such as for example, by gel permeation chromatography (GPC) equipped with suitable detector and calibration standards, such as differential refractive index detector calibrated with narrow-distribution polystyrene standards. Each of the block copolymers of this invention typically exhibit very low polydispersity index ($PDI=M_w/M_n$). In general, the PDI of each of the blocks of the block copolymers of this invention is less than 2. In some embodiments the PDI is less than 1.5, less than 1.4, less than 1.3, less than 1.2 or less than 1.1. However, it should be noted that in some embodiments the PDI can be higher than 2, such as for example, higher than 3.

Pervaporation Membrane Applications

As noted, the block polymers of this invention exhibit several unique properties, and therefore, are useful in several different applications, including as membrane materials for separation, antireflective coatings, electronic and/or optoelectronic applications, among others.

With the increased interest in producing biological fuel, such as ethanol, butanol, and the like, there is a heightened interest in developing environmentally friendly separation processes that economically separate organic materials from water. There is also growing need for purification of water stream contaminated by an industrial process as well as to the isolation of an organic product from an aqueous fermentation broth designed to form various organic solvents via a biological process, for example, phenol from the broth of a fermentation reactor or any other biologically formed broth, e.g., an algae broth. Also, there is a growing interest in separating value-added products from biological and industrial waste including any biomass-derived waste. While it is well known to use processes such as distillation and gas stripping to effect such separations, these conventional processes, particularly distillation, are generally characterized by high capital and energy costs thus often making such conventional processes problematic, for example, it has been noted that in excess of 60% of the heating value of a biofuel such as butanol can be "wasted" if conventional separation processes are employed.

Even more importantly the organic products, particularly, the organic solvents that are either made by the above noted bio-processes or extracted from organic wastes are gaining more and more industrial applications. For instance, about half of the n-butanol produced and its esters (e.g., n-butyl acetate) are used as solvents in the coatings industry, including as solvents for dyes, e.g., printing inks. Other well known applications of butyl esters of dicarboxylic acids, phthalic anhydride and acrylic acid include as plasticizers, rubber additives, dispersants, semisynthetic lubricants, additives in polishes and cleaners, e.g., floor cleaners and stain removers, and as hydraulic fluids. Butanol and its esters are also used as solvents, including as extractants in the production of drugs and natural products, such as antibiotics, hormones, vitamins, alkaloids and camphor. Various other uses of butanol and its esters and ethers include as solubilizer in the textile industry, e.g., as additive in spinning baths or as carrier for coloring plastics, as additives in de-icing fluids, additive in gasoline for spark-ignition engines, as feedstock for the production of glycol ethers, among various other uses.

Therefore, an alternate process for effecting such separations known as pervaporation has received considerable attention as a solution to the aforementioned "waste". In a pervaporation process, a charge liquid, typically a mixture of two or more liquids, such as a fermentation broth, is brought into contact with a membrane film having the property to allow one component of the charge liquid to preferentially permeate the membrane. This permeate is then removed as a vapor from the downstream side of the membrane film, generally by applying vacuum on the permeate side of the membrane. Particularly, pervaporation process has proven to be a method of choice in the separation of liquid mixtures having similar volatilities, such as azeotropic mixtures that are difficult to separate by conventional methods. While polymers such as polyimides, polyether-polyamide, polydimethylsiloxanes and the like have been used to form pervaporation membranes with some success, none have demonstrated thus far the necessary characteristics needed for a commercially viable membrane material. For example, pervaporation membranes, such as PERVAP 1060 (made from poly(dimethylsiloxane), PDMS), PERVAP 1070 (made from zeolite, ZSM-5, filled PDMS) (Sulzer Chemtech Membrane Systems A.G., Neunkirchen, Germany) and PEBA (block copolymer polyether-polyamide, GKSS-Forschungszentrum Geesthacht GmbH, Geesthacht, Germany) are available for the separation of various low volatile organics from aqueous mixtures. However, there is still a need to develop membranes having better performance, which can provide efficient separation of organics from aqueous mixtures at lower capital and reduced operating cost.

Disclosed herein are embodiments in accordance with the present invention that encompass block polymer embodiments, film and film composite embodiments and pervaporation membrane embodiments formed therefrom that advantageously provide hitherto unachievable separation of organics from a variety of mixtures including fermentation broth, industrial waste, among others.

Exemplary embodiments of the present invention will be described hereinbelow. Various modifications, adaptations or variations of such exemplary embodiments may become apparent to those skilled in the art as such are disclosed. It will be understood that all such modifications, adaptations or variations that rely upon the teachings of the present invention, and through which these teachings have advanced the art, are considered to be within the scope and spirit of the present invention. For example, while the exemplary embodiments described herein generally reference the separation of butanol and/or phenol from an aqueous charge liquid, such are not meant to limit the present invention only to embodiments for butanol and/or phenol separation. Thus some embodiments of the present invention encompass the separation of any organic material from an aqueous based charge liquid where an appropriate pervaporation membrane encompassing a nanoporous film formed from a block polymer as disclosed herein is employed. For example, some embodiments encompass the separation of a hydrophobic organic material from a hydrophilic charge liquid using an appropriate nanoporous pervaporation membrane. Still other embodiments of the present invention encompass separation of non-polar and polar organic materials. Examples of such separations include, but are not limited to, aromatics such as benzene or toluene from water miscible alcohols such as methanol or ethanol and the separation of non-polar hydrocarbyl-based materials such as hexanes and heptanes from polar heterocarbyl-based materials. Various other organics also include volatile organic solvents, such as tetrahydrofuran (THF), ethyl acetate (EA), acetone, methyl ethyl ketone (MEK), methyl isobutyl ketone (MIBK), and the like, all of which can be present either in a fermentation broth or in an industrial waste.

The expected behavior of a pervaporation membrane made of a hydrophobic polymer is to become plasticized and/or swollen as the organic concentration increases. Plasticized and/or swollen membranes generally cause an undesirable increase in permeability of both the organic and water, with the water permeability generally increasing relatively more than the organic permeability thus resulting in a reduction in separation factor. Unexpectedly, nanoporous pervaporation membranes, which are generally hydrophobic, exhibit a behavior opposite as to what is generally expected. Polynorbornene based nanoporous pervaporation membranes as described herein are expected to have a separation factor that increases dramatically with increasing feed concentration (that is, an increase in the organic concentration of a feed stream).

Typically in pervaporation, a multi-component liquid stream is passed across a pervaporation membrane that preferentially permeates one or more of the components. As the multi-component liquid stream flows across the pervaporation membrane surface, the preferentially permeated components pass through the pervaporation membrane and are removed as a permeate vapor. Transport through the pervaporation membrane is induced by maintaining a vapor pressure on the permeate side of the pervaporation membrane that is lower than the vapor pressure of the multi-component liquid stream. The vapor pressure difference can be achieved, for example, by maintaining the multi-component liquid stream at a higher temperature than that of the permeate stream. In this example, the latent heat of evaporation of the permeate components is supplied to the multi-component liquid stream for maintaining the feed temperature and for continuing the pervaporation process. Alternatively, the vapor pressure difference is typically achieved by operating at below atmospheric pressure on the permeate side of the pervaporation module. A partial vacuum on the permeate side of the nanoporous pervaporation membrane can be obtained by any one of: relying on the pressure drop that occurs as a result of the cooling and condensation that takes place in the condenser unit, and/or by use of a vacuum pump. An optional sweep gas on the permeate side can facilitate the pervaporation process by lowering the concentration of the permeating components. The vapor pressure of the feed liquid can be optionally raised by heating the fermentation broth. While polynorbornene pervaporation membranes have already been disclosed in U.S. Pat. No. 8,215,496, pertinent disclosures of which are hereby incorporated by reference, and where such membranes have met with some success, the polynorbornene pervaporation membrane disclosed and claimed herein provide significant improvements over such previously disclosed membranes, which is apparent from the following disclosure.

Accordingly, there is provided a pervaporation membrane encompassing a nanoporous film formed from any one of the block polymers of the formulae (I), (III), (IV) or (V) as disclosed herein. That is, any of the diblock or triblock polymers of this invention can be used to form the pervaporation membranes of this invention. In one of the embodiments the pervaporation membrane of this invention encompasses a diblock polymer of formula (I) of this invention. In another embodiment the pervaporation membrane of this invention encompasses a triblock polymer of formula (III) or (IV) or a polymer of formula (V) of this invention.

In another embodiment, the pervaporation membrane of this invention is made from a diblock copolymer selected from the group consisting of:

a diblock polymer derived from 5-hexylbicyclo[2.2.1]hept-2-ene and norbornenyl-2-trifluoromethyl-3,3,3-trifluoropropan-2-ol (HexNB-b-HFANB);

a diblock polymer derived from 5-butylbicyclo[2.2.1]hept-2-ene and norbornenyl-2-trifluoromethyl-3,3,3-trifluoropropan-2-ol (BuNB-b-HFANB);

a diblock polymer derived from 5-butylbicyclo[2.2.1]hept-2-ene and 1-(4-(bicyclo[2.2.1]hept-5-en-2-yl)butyl)-3,4-dimethyl-1H-pyrrole-2,5-dione ($C_4F_9$NB-b-BuDMMINB);

a diblock polymer of derived from norbornenyl-2-trifluoromethyl-3,3,3-trifluoropropan-2-ol and 2-(bicyclo[2.2.1]hept-5-en-2-yl)bicyclo[2.2.1]heptane (HFANB-b-NBANB); and a diblock copolymer of derived from 5-hexylbicyclo[2.2.1]hept-2-ene and 2-(bicyclo[2.2.1]hept-5-en-2-yl)bicyclo[2.2.1]heptane (HexNB-b-NBANB).

In another embodiment, the pervaporation membrane of this invention is made from a triblock polymer selected from the group consisting of:

a triblock polymer derived from norbornenyl-2-trifluoromethyl-3,3,3-trifluoropropan-2-ol, 5-decylbicyclo[2.2.1]hept-2-ene and norbornenyl-2-trifluoromethyl-3,3,3-trifluoropropan-2-ol (HFANB-b-DecNB-b-HFANB); and a triblock polymer derived from norbornenyl-2-trifluoromethyl-3,3,3-trifluoropropan-2-ol, 5-butylbicyclo[2.2.1]hept-2-ene and norbornenyl-2-trifluoromethyl-3,3,3-trifluoropropan-2-ol (HFANB-b-BuNB-b-HFANB);

a triblock polymer derived from norbornenyl-2-trifluoromethyl-3,3,3-trifluoropropan-2-ol, 5-octylbicyclo[2.2.1]hept-2-ene, and 1-(4-(bicyclo[2.2.1]hept-5-en-2-yl)butyl)-3,4-dimethyl-1H-pyrrole-2,5-dione (HFANB-b-OctNB-b-BuDMMINB); and a triblock polymer derived from norbornenyl-2-trifluoromethyl-3,3,3-trifluoropropan-2-ol, 5-butylbicyclo[2.2.1]hept-2-ene, and 1-(4-(bicyclo[2.2.1]hept-5-en-2-yl)butyl)-3,4-dimethyl-1H-pyrrole-2,5-dione (HFANB-b-BuNB-b-BuDMMINB).

The pervaporation membranes of this invention can be in any suitable form to effect separation of a desirable material, for example butanol, from a fermentation broth. Examples include spiral wound modules, fiber membranes including hollow fiber membranes, tubular membranes, and flat sheet membranes, such as in a plate and frame configuration, a supported or unsupported dense film, or a thin film composite.

When the block polymer pervaporation membranes are in an unsupported dense film form, the thickness of the dense film is from about 1 micron to about 500 microns. In another embodiment, the thickness of the dense film is from about 5 microns to about 100 microns.

When the pervaporation membranes are in the form of a thin film composite, such membranes can be thinner than unsupported membranes, for example as thin as about 0.1 microns. Further, the membrane contains at least one layer of block polymer and at least one layer of a non-block polymer component. Such composites can contain multiple layers of block polymer membranes and multiple layers of non-block polymer component. Examples of the non-block polymer component include various other polymers and inorganic materials. Examples of such polymers include polyethylenes including TYVEK®, polypropylenes, polyesters, polyimides, polycarbonates, polytetrafluoroethylene, poly(vinylidene fluoride) (PVDF), poly(methyl methacrylate) (PMMA), polyacrylonitrile (PAN), mixed co- and ter-polymers thereof, and the like. Examples of inorganic materials include zeolites, glass frits, carbon powder, metal sieves, metal screens, metal frit, and the like.

A schematic diagram of the pervaporation process is shown in FIG. 1. As depicted, a feed containing numerous species is charged into a pervaporation module 100 and to a liquid chamber 102 on the feed side thereof. Vapor chamber 104 on the permeate side is separated from the liquid chamber 102 by a pervaporation membrane 106. The vapor phase is extracted from the feed liquid through the pervaporation membrane 106 which is selective for a given permeate, and the permeate vapor, which is enriched in the given permeate relative to the feed liquid, and is removed from the pervaporation module 100, generally by condensation thereof.

Utilizing nanoporous block polymer pervaporation membranes, pervaporation can be employed to treat a fermentation broth containing, for example, biobutanol, ethanol or phenol and one or more other miscible components. More specifically, a fermentation broth can be added to the liquid chamber 102 and thus placed in contact with one side of pervaporation membrane 106 while a vacuum or gas purge is applied to vapor chamber 104. The fermentation broth can be heated or unheated. The components in the fermentation broth sorb into/onto pervaporation membrane 106, permeate through and evaporate into the vapor phase. The resulting vapor or permeate, for example butanol (or phenol), is then condensed and collected. Due to different species in the fermentation broth having different affinities for the pervaporation membrane and different diffusion rates through the membrane, even a component at low concentration in the feed can be highly enriched in the permeate. Accordingly, in one of the embodiments there is provided a pervaporation membrane, which is capable of preferential permeability to a volatile organic over water. The permeability of a volatile organic through pervaporation membrane of the present invention generally increases with increasing organic concentration of a feed stream. In another embodiment, such volatile organics include without any limitation butanol, phenol, and the like.

Figure 2:
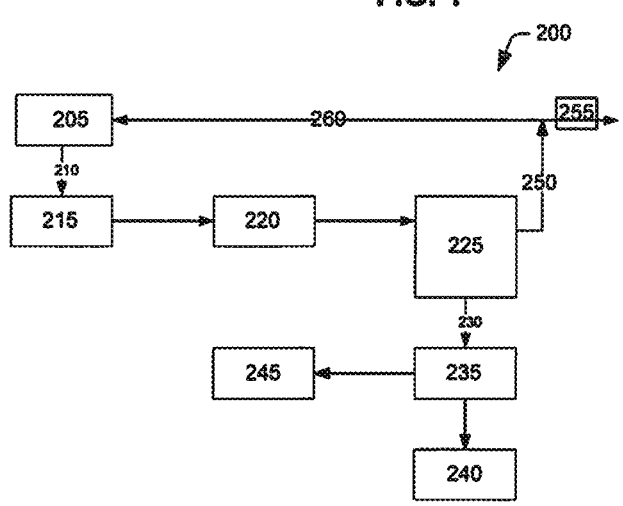
FIG. 2 depicts a pervaporation system in accordance with embodiments of the invention.

FIG. 2 depicts an exemplary pervaporation system 200 that can be employed to separate butanol, or other desirable materials, from a crude fermentation broth (or an aqueous industrial waste or other waste including biomass-waste) containing a valuable organic compound, such as biobutanol or phenol. Crude fermentation broth (or other waste including industrial and/or biomass) as a feed stream 210 from a feed tank 205 is pumped via pump 215 through a heater 220 to increase its temperature. The fermentation broth is then charged under pressure to a pervaporation module 225 containing a pervaporation membrane. Permeate vapor 230 containing butanol (or phenol) is obtained from the pervaporation module 225 by applying vacuum (using vacuum pump 245), where the butanol vapor (or phenol vapor) is condensed in a condenser 235, and collected in collector 240. Residual fermentation broth or retentate stream 250 that does not pass through the polynorbornene pervaporation membrane can be either discharged (255) from the system 200 or directed to a recycling stream 260 and returned to the feed tank 205.

Supplemental methods that complement the pervaporation process include removing solids from the fermentation broth by centrifugation, filtration, decantation, dephlegmation or the like; and increasing the concentration of butanol in the permeate using adsorption, distillation or liquid-liquid extraction or the like.

Butanol from biomass is often referred to as biobutanol. Biobutanol can be produced by fermentation of biomass by the acetone-butanol-ethanol fermentation (A.B.E.) process. See, for example, S-Y Li, et al. Biotechnol. Prog. 2011, vol. 27(1), 111-120. The process uses the bacterium of the genus *Clostridium*, such as *Clostridium acetobutylicum*, but others including *Saccharomyces cerevisiae*, *Zymomonas mobilis*, *Clostridium thermohydrosulfuricum*, *Escherichia coli*, *Candida pseudotropicalis*, and *Clostridium beijerinckii*, can be used. Biobutanol can also be made using genetically modified yeasts for the production of biobutanol from cellulosic materials. The crude fermentation broth containing biobutanol can be advantageously processed by the pervaporation membrane depicted in FIG. 1 and/or the pervaporation system depicted in FIG. 2 to provide concentrated butanol, as compared to the concentration thereof in the crude broth. It should further be noted that the pervaporation membranes of this invention are also useful for separation of various alcohols other than butanol, including ethanol and phenol from the respective fermentation broths or industrial or biomass waste.

Fermentation broths generally contain a variety of carbon substrates. In addition to the carbon source, fermentation broths can contain suitable minerals, salts, cofactors, buffers and other components, known to those skilled in the art, suitable for the growth of the cultures and promotion of the enzymatic pathway necessary for butanol production. Examples of fermentation broths that are commercially available include Luria Bertani (LB) broth, Sabouraud Dextrose (SD) broth, or Yeast Medium (YM) broth. Any of these known fermentation broths can be used in the present invention in order to separate the volatile organics from such broths.

Similarly, it should be noted that various other organic products are selectively formed from a fermentation process. For instance, phenol often termed as "green phenol" can be formed from appropriate waste, including biological waste or industrial waste, and by employing appropriate biological organisms to effect the fermentation to proceed selectively to phenol. It has been reported that phenol can be selectively produced from a recombinant strain of the solvent-tolerant bacterium *Pseudomonas putida* S12, see, for example, L. Heerema, et. al. Desalination, 200 (2006), pp 485-487. It has also been reported that various other yeast strains also produce phenol, all of which use bacterium of the genus *Saccharomyces*, such as *Saccharomyces cerevisiae* r.f. *bayanus*, EP 171 Lalvin; *Saccharomyces bayanus*, Ever; *Saccharomyces ellipsoideus*, Ceppo 20 *Castelli; Saccharomyces oviformis*, Ceppo 838 *Castelli; Saccharomyces cerevisiae* r.f. *cerevisiae*, K1 aLalvin; and *Saccharomyces cerevisiae*, D254 Lalvin. These organisms are able to produce different amounts of phenolic substance from a synthetic and/or natural organic sources whose main carbon source is glucose. See, M. Giaccio, J. Commodity Science (1999), 38(4), 189-200. In general, as used herein "green phenol" generically refers to phenol produced by a fermentation broth, which contains phenol from about 0.1% to about 6% phenol. In other embodiments, the fermentation broth contains from about 0.5% to about 3% phenol.

As used herein, "butanol" generically refers to n-butanol and its isomers. In some embodiments in accordance with the present invention, the fermentation broth contains from about 0.1% to about 10% butanol. In other embodiments, the fermentation broth contains from about 0.5% to about 6% butanol. In some other embodiments, the fermentation broth contains from about 1% to about 3% butanol. Generally, the pervaporation membranes described herein are effective at separating volatile organics, such as butanol, ethanol or phenol from fermentation broths containing relatively low to high levels of volatile organics, yet in some embodiments the fermentation broth contains at least about 1% volatile organics.

It should further be noted that certain of the "green phenol" feedstock can also be generated using phenolic based resins, such as novolak resins, and the like. Such feed streams can also be used in the pervaporation process of this invention where the phenol can be separated and/or enriched from the waste stream. Furthermore, various such phenol streams also contain certain inorganic and organic salts as impurities. As a result, it is difficult to remove such inorganic salts from the feed stream and to obtain phenol in the pure enriched form. However, surprisingly it has now been found that the pervaporation membranes of the instant invention are capable of separating such inorganic and organic salts. Representative examples of inorganic salts include, without any limitation, salts of lithium, sodium, potassium, magnesium, calcium, barium and the like. The salts of these metals with any counter anions can be used in this invention. Such examples of non-limiting anions include, phosphate, sulfate, acetate, benzoate, and the like. However, other anions such as methanesulfonate (mesylate), trifluoromethanesulfonate (triflate), p-toluenesulfonate (tosylate), and halides, such as fluoride, chloride, bromide and iodide can also be separated from the feed stream.

In one of the embodiments there is provided a process of separating an organic product from a feedstock selected from a fermentation broth or an industrial waste containing the organic product, such as butanol, ethanol, phenol, THF, ethyl acetate, acetone, toluene, MEK, MIBK, etc. In some embodiments, the fermentation broth is charged to a pervaporation module containing a pervaporation membrane formed by any one of the block polymer as described herein. The permeate vapor containing the organic product from the pervaporation module is then collected. In this process, it may be advantageous to heat the crude fermentation broth feed to a temperature that facilitates the organic product passage through the pervaporation membrane of this invention. In one embodiment, the crude fermentation broth feed is heated to a temperature from about 30° C. to about 110° C. In another embodiment, the crude fermentation broth feed is heated to a temperature from about 40° C. to about 90° C. In yet another embodiment, the crude fermentation broth feed is heated to a temperature from about 50° C. to about 70° C. It should be noted that the desired temperature may depend upon the type of organics that is being separated. For example, relatively lower temperatures are employed in the separation of butanol whereas somewhat higher temperatures are desirable while separating phenol. Accordingly, in one of the embodiments the fermentation broth containing butanol feed is heated to a temperature in the range of from about 30° C. to about 90° C. In another embodiment the fermentation broth containing phenol feed is heated to a temperature in the range of from about 40° C. to about 110° C.

To facilitate pervaporation, a suitable vacuum can be applied to the vapor chamber of the pervaporation module. In one embodiment, the vacuum applied is from about 0.1 in Hg to about 25 in Hg. In another embodiment, the vacuum applied is from about 0.15 in Hg to about 5 in Hg. In another embodiment, the vacuum applied is from about 0.2 in Hg to about 4 in Hg.

Other processes include methods of increasing a separation factor for an organic product, such as butanol, phenol or ethanol, as a concentration of the organic product increases in a pervaporation feed stream. Such methods involve using a pervaporation membrane to separate the organic product from the pervaporation feed stream.

As used herein, "SF" is the separation factor which is a measure of quality of the separation of a first species relative to a second species and is defined as the ratio of the ratio of permeate compositions to the ratio of the feed compositions.

As used herein, flux is the amount that flows through a unit area of a membrane per unit of time.

Flux and SF can also be described by the following equations:

$$\text{Flux}(J) = \text{mass}/(\text{area} \cdot \text{time})$$

Seperation Factor (SF)

$$SF_{12} = \left(\frac{y_1/y_2}{x_1/x_2}\right) = \left(\frac{J_1/J_2}{x_1/x_2}\right) = SF_{VLE}SF_{membrane}$$

$y$ = Permeate concentration $x$ = Feed liquid concentration

Accordingly, the efficiency of a pervaporation membrane can be evaluated at least in two respects, a separation factor (the ratio of enrichment obtained when the liquid mixture permeates through the membrane) and the flux at which a liquid mixture permeates through the polymeric membrane. Thus, the higher the separation factor and flux of a membrane, the higher the separation efficiency of such membrane. Of course this is a very simplified analysis as low separation factors can often be overcome through the use of multistage membrane processes, and where the flux factor of a membrane is low, often forming such a membrane with a high surface area can overcome low flux. Thus while the separation and flux factors are important considerations, other factors such as a membrane's strength, elasticity, resistance to becoming fouled during use, thermal stability, free volume and the like are also important considerations in selecting the best polymer for forming a pervaporation membrane.

It has now been found that the pervaporation membrane of this invention has a suitable separation factor (SF) for volatile organics, such as butanol, phenol or ethanol to provide an effective means to remove volatile organics, such as butanol, phenol or ethanol from a fermentation broth or from other waste as described herein. In one embodiment, the pervaporation membrane has a SF for volatile organics, such as butanol, phenol or ethanol of at least about 5. In another embodiment, the pervaporation membrane has a SF for volatile organics, such as butanol, phenol or ethanol of at least about 10. In yet another embodiment, the pervaporation membrane has a SF for volatile organics, such as butanol, phenol or ethanol of at least about 15. In still yet other embodiments, the pervaporation membrane has a SF for volatile organics, such as butanol, phenol or ethanol of at least about 20, at least about 25, or at least about 30. Moreover, any of the foregoing SFs can be achieved when the concentration of volatile organics, such as butanol, phenol or ethanol in a feed stream is 0.5% or higher, 1% or higher, 2% or higher, 3% or higher, or 4% or higher, or 5% or higher, or 6% or higher.

A suitable flux for volatile organics, such as butanol, phenol or ethanol can be achieved using polynorbornene pervaporation membranes of the present invention to provide an effective means to remove volatile organics, such as butanol, phenol or ethanol from a fermentation broth. In one embodiment, a flux for volatile organics, such as butanol, phenol or ethanol of at least about 100 g/m$^2$/hr can be achieved using such polynorbornene pervaporation membranes. In another embodiment, a flux for volatile organics, such as butanol, phenol or ethanol of at least about 150 g/m$^2$/hr can be achieved; in yet another embodiment, a flux for volatile organics, such as butanol, phenol or ethanol of at least about 200 g/m$^2$/hr can be achieved and in still another embodiment, a flux for volatile organics, such as butanol, phenol or ethanol of at least about 250 g/m$^2$/hr can be achieved using such polynorbornene pervaporation membranes. Furthermore, unlike what is generally found using previously known non-polynorbornene pervaporation membranes, any of the foregoing fluxes can be achieved when the concentration of volatile organics, such as butanol, phenol or ethanol in a feed stream is 0.5% or higher, 1% or higher, 2% or higher, 3% or higher, or 4% or higher, or 5% or higher, or 6% or higher.

It has been surprisingly found that various nanoporous films formed from various block polymers of formulae (I), (III), (IV) or (V), as described herein are suited for use in forming pervaporation membranes. It has been further observed that suitable combination of diblock polymer or triblock terpolymer as described herein are well suited for tailoring the resulting polymer's physical (e.g., glass transition temperature (T$_g$), modulus, free volume, hydrophobicity, hydrolytic stability, and the like) and pervaporation characteristics (e.g., SF and flux). It should further be noted that block polymers of this invention can be tailored to exhibit relatively high glass transition temperatures, the block polymers of this invention can possibly offer the ability of operation as a pervaporation membrane at temperatures higher than possible for currently known membranes.

In one of the embodiments there is provided a method of separating an organic product from a feedstock selected from a fermentation broth or a waste containing the organic product comprising:

charging the feedstock to a pervaporation module containing a pervaporation membrane formed from a nanoporous film obtained from a block polymer of formulae (I), (III), (IV) or (V); and collecting a permeate vapor containing the organic product from the pervaporation module.

As already noted, the pervaporation can be carried out at any desirable temperature. Thus, in one of the embodiments, pervaporation is carried out where the fermentation broth is charged to the pervaporation module at a temperature from about 30° C. to about 110° C. The vacuum applied to the pervaporation module in this embodiment may range from about 0.1 in Hg to about 25 in Hg.

In this aspect of the method of this invention, the pervaporation membrane is formed by a nanoporous film formed from a polymer selected from:

a diblock polymer derived from 5-hexylbicyclo[2.2.1]hept-2-ene and norbornenyl-2-trifluoromethyl-3,3,3-trifluoropropan-2-ol (HexNB-b-HFANB);

a diblock polymer derived from 5-butylbicyclo[2.2.1]hept-2-ene and norbornenyl-2-trifluoromethyl-3,3,3-trifluoropropan-2-ol (BuNB-b-HFANB);

a diblock polymer derived from 5-butylbicyclo[2.2.1]hept-2-ene and 1-(4-(bicyclo[2.2.1]hept-5-en-2-yl)butyl)-3,4-dimethyl-1H-pyrrole-2,5-dione (C$_4$F$_9$NB-b-BuDMMINB);

a diblock polymer of derived from norbornenyl-2-trifluoromethyl-3,3,3-trifluoropropan-2-ol and 2-(bicyclo[2.2.1]hept-5-en-2-yl)bicyclo[2.2.1]heptane (HFANB-b-NBANB); and a diblock copolymer of derived from 5-hexylbicyclo[2.2.1]hept-2-ene and 2-(bicyclo[2.2.1]hept-5-en-2-yl)bicyclo[2.2.1]heptane (HexNB-b-NBANB).

In this aspect of the method of this invention the organic product which is separated from biomass or organic waste is butanol, ethanol or phenol.

In another aspect of this invention there is also provided a method of separating volatile organic products, such as for example, butanol or phenol from a feedstock selected from a fermentation broth or a waste containing such volatile organics, such as, butanol or phenol. The method encompasses the following:

charging the feedstock to a pervaporation module containing a pervaporation membrane formed by a nanoporous film as described herein; and collecting a permeate vapor containing butanol or phenol from the pervaporation module.

The pervaporation membranes of this invention can readily be formed by any of the techniques known in the art. For example, a suitable diblock or triblock polymer of formula (I), (III), (IV) or (V) of this invention encompassing desirable and distinctive repeat units of polycycloalkyl norbornene-type monomers of formula (IIA) is generally dissolved in a suitable organic solvent to form a solution. The polymer solution is then generally filtered through a suitable filter to remove any residual contaminants. After filtration, trapped gas can be removed. The polymer solution can then be formed into a film by any of the known methods in the art. For instance, the polymer solution is poured onto a substrate and pulled to form a film. The film is then dried and removed from the substrate, if any, and is ready for use. The films formed in this fashion are generally considered as single thickness films, specific examples of this embodiment are further described below. In some embodiments, the films are cast as double thickness films by forming a second layer of film on the first formed film. In some other embodiments the polymer solution is applied on to a polymer web to form a reinforced membrane, either on a sheet to form a supported membrane or on a substrate panel to form a non-supported membrane. In other embodiments the polymer solution can be suitably cast to form a tubular composite, or a hollow fiber. Accordingly, in one of the embodiments, the pervaporation membrane of this invention is in a form of a tubular composite, hollow fiber, a dense film flat sheet, or a thin film composite.

The drying of the films so formed can be carried out at any of the temperatures to obtain the intended result. Typically, the drying is carried out at a temperature in the range of from about 30° C. to about 120° C., in some other embodiments it is from about 50° C. to 100° C., or from 70° C. to 90° C. The time required to dry the membrane can range from about 10 minutes to 1 day, or 30 minutes to 20 hours, or 1 hour to 16 hours.

After the film is formed and dried as noted above, the film can be immersed in a solvent which will only swell selectively one of the blocks in the block polymer. That is, one of the blocks of the polymer is more soluble in such solvent while the other block is unaffected by that solvent. Such solvents include alcohols, such as for example, butanol, and the like. After selective solvent swelling of the film, the solvent retained in the film can be removed by a non-solvent, such as for example water. In order to facilitate complete removal of the solvent it may be desirable to treat the swollen film in an intermediary solvent which is miscible with both solvent and non-solvent such as for example ethanol or isopropanol. However, one of skill in the art would readily appreciate that a range of solvents, non-solvents and intermediary solvents as described herein can be employed to form a nanoporous films of this invention. Advantageously, it has now been found that by practice of this invention it is now possible to make highly stable, high porosity films by selective solvent swelling and subsequent solvent extraction by water as described herein. The nanoporous films formed in this fashion are found to be robust with a density modulus scaling similar to natural cellular solids. As a result, these films find many applications, including as pervaporation membranes as described herein, among other uses. An illustrative of such other uses include anti-reflective coatings for glass with >99% transmission of visible light.

Accordingly, there is further provided a method for forming a nanoporous film comprising the following steps:

forming a solution of a diblock polymer of formula (I) as described herein or a triblock polymer of formulae (III) or (IV) in a suitable organic solvent;

coating the polymer solution onto a suitable substrate to form a polymeric film on said substrate;

drying the substrate at a suitable temperature;

immersing said film in $(C_4-C_6)$alkanol for sufficient length of time to cause phase separation and then optionally immersing said phase separated film in $(C_2-C_3)$alkanol; and immersing said $(C_4-C_6)$alkanol or $(C_2-C_3)$alkanol immersed film in water to remove residual $(C_2-C_3)$alkanol; and drying said film at a suitable temperature under inert atmosphere.

As noted, the block polymers as used herein can be dissolved in any of the solvents which would dissolve such polymers to form a solution. Again, as noted above, the polymer solution can be applied onto a suitable substrate using any of the methods known in the art as described above. Such a substrate includes any appropriate substrate as is, or may be used for any desirable applications, including but not limited to membranes, electrical, electronic or optoelectronic devices, for example, a semiconductor substrate, a ceramic substrate, a glass substrate. With regard to said coating method, any of the coating method can be employed, for example spin coating, spraying, doctor blading, meniscus coating, ink jet coating and slot coating.

Next, the coated substrate is dried at a suitable temperature. Any of the temperature conditions can be employed, for example, ambient, sub-ambient or super-ambient conditions. Typically, such drying is carried out by heating to facilitate the removal of residual casting solvent, for example to a temperature from 30° C. to 70° C. or from 70° C. to 130° C. for from 1 to 30 minutes, although other appropriate temperatures and times can be used.

Next, the coated substrate is immersed in a suitable alkanol to cause phase separation of the film. As used herein "phase separation" or "solvent swelling" can be used interchangeably in order to explain the effect of solvent swelling on the film. Any of the diblock polymer of formula (I) as described herein or a triblock polymer of formulae (III) or (IV) or a polymer of formula (V) can be employed to form the films of this invention. Advantageously, it has now been found that the films formed from the diblock or triblock polymers of this invention can be treated with a variety of alcohols to cause the "solvent swelling" effect. Typically, as already noted above, such solvents to induce the swelling of the film include alcohols, such as for example $(C_4-C_6)$ alkanol. However, any other solvent which would bring about such a swelling effect can also be employed. Examples of such $(C_4-C_6)$alkanol include without nay limitation n-butanol, iso-butanol, tert-butanol, 1-pentanol, 2-pentanol, 3-pentanol, amyl alcohol, iso-amyl alcohol, tert-amyl alcohol, 1-hexanol, 2-hexanol, 3-hexanol, and the like. It should further be noted that mixtures in any combination of these alcohols and/or other solvents can also be used.

The films which are swollen using $(C_4-C_6)$alkanol can then be immersed in $(C_2-C_3)$alkanol in order to exchange $(C_4-C_6)$alkanol with $(C_2-C_3)$alkanol in order to facilitate the removal of alcohol solvent with water. This can be an optional step. That is, if $(C_4-C_6)$alkanol can itself be exchanged with water then there is no need to immerse such swollen films in $(C_2-C_3)$alkanol. Thus, this step of immersing in $(C_2-C_3)$alkanol serves as a step to ensure all $(C_4-C_6)$ alkanol entrapped in the film can be removed in the final step of immersing in water. Since $(C_2-C_3)$alkanols are contemplated to be miscible both with $(C_4-C_6)$alkanol and water, this step facilitates and/or ensures removal of all $(C_4-C_6)$ alkanol. Thus any of the $(C_2-C_3)$alkanols as well as any other solvents which will bring about this effect can be employed herein. Examples of $(C_2-C_3)$alkanols that are suitable in this step include without any limitation, ethanol, n-propanol and iso-propanol. Other solvents which may also bring about this effect can include ketone solvents, such as for example, acetone, methyl ethyl ketone (MEK), or ester solvents, such as for example, ethyl acetate, and the like.

After immersing the swollen substrate in water to remove all of the residual alcohols, the film is again dried to remove all solvents and water. This drying step cab be carried out using the same procedure as described above. That is, such drying can be carried out at any suitable temperature conditions including ambient, sub-ambient or super-ambient conditions, and if needed inert atmospheric conditions.

It should further be noted that after coating of the substrate with polymer solution, the film so formed can be removed immediately after drying the substrate and the free standing film can be used in the subsequent alcohol immersion step to cause it to be swollen as described herein. Similarly, the swollen and phase separated film can be separated from the substrate after drying, i.e., at the final step of forming the high porosity nanoporous film. Accordingly, in some embodiments the method of forming nanoporous membrane further includes a step of separating the film from the substrate immediately after forming the film on the substrate. In some other embodiments the method of forming nanoporous membrane further includes a step of separating the film from the substrate after immersing in series of alcohols and water.

The films as cast and swollen in accordance of this invention can be characterized by any of the methods known in the art. For example, atomic force microscopy (AFM) can be employed to study the morphological changes of the films as described herein. As noted, any of the diblock polymers as disclosed herein can be employed to form the nanoporous films of this invention. For example, a diblock polymer of BuNB-HFANB is found to provide an excellent nanoporous film. The homopolymer, poly-HFANB, is soluble in lower alcohols, e.g., ($C_2$-$C_4$)alkanol, while a homopolymer, poly-BuNB, is barely swollen by these lower alcohols. This significant difference in selectivity provides the basis for significant swelling for the fabrication of nanoporous films. For instance, when a diblock polymer of BuNB-HFANB is immersed in a suitable ($C_4$-$C_6$)alkanol, for example, butanol, the film does not dissolve, but is highly swollen. This appears to be the result of butanol having great affinity to HFANB blocks. That is, as noted above, poly-HFANB is completely soluble in butanol. Whereas, the butanol swelling of the HFANB block appears to have no effect on the BuNB block (i.e., the poly-BuNB phase) other than perhaps some degree of plasticizing effect on the BuNB blocks.

It should further be noted that ethanol itself can be used as a solvent for phase separation, i.e., to form nanoporous films of this invention, however, the porosity of the film may be reduced. That is, after butanol is exchanged with ethanol and then water (non-solvent for poly-HFANB), the porosity of the film is greater than for ethanol alone. The extraction of alcohol by water from the swollen polymer film produces a porous structure and no further drying is necessary.

Generally, it is expected that the fabrication of high porosity films may lead to destruction of the porous structure by the large capillary stresses associated with the surface tension of water for most materials. Surprisingly, however, water in the last step of the fabrication of a nanoporous film of this invention does not destroy the porous structure as otherwise contemplated by the references known in the art. See for example, S. Bandi et al., Macromolecules, 2005, 38, 9216-9220. To the contgrary, by practice of this invention it is now possible to process high porosity films using diblock or triblock polymers as described herein.

The porous structure of the films can be characterized by a number of techniques known to one skilled in the art, such as for example, ellipsometric measurements, which measures the increase in the thickness of the film before and after solvent treatment as described herein. It has now been observed that by practicing the process of this invention the thickness of the film can increase from 100 to 200 nm as cast to 250 to 600 nm of the highly nanoporous films.

Similarly, it has been observed that the refractive index of the as cast films decrease significantly as the films are fabricated into nanoporous structures. Generally, the refractive index decreases from 1.5 to 1.6 for as cast film to 1.2 to 1.1 for nano-porous films of this invention. Surprisingly, additional drying, such as for example, at 120 to 150° C. for 2 to 4 hours does not appreciably impact either the thickness or refractive index of the film. This result suggests that removal of solvent (i.e., butanol) from the swollen film using secondary solvents (i.e., ethanol) and/or water does not affect the pores. That is, for example, water extracts the ethanol out of the thin film without filling the pores. The porosity of the diblock or triblock polymer thin films is determined from the change in refractive index by applying the Bruggemann effective medium approximation using the following equation:

$$P\frac{n_1^2 - n_{eff}^2}{n_1^2 + 2n_{eff}^2} + (1-P)\frac{n_2^2 - n_{eff}^2}{n_2^2 + 2n_{eff}^2} = 0$$

where $n_1$, $n_2$ and $n_{eff}$ are the refractive indices of air, the skeletal diblock or triblock polymer and porous diblock or triblock polymer, respectively, and P is the volume fraction of voids in the nanoporous thin film.

Figure 3:
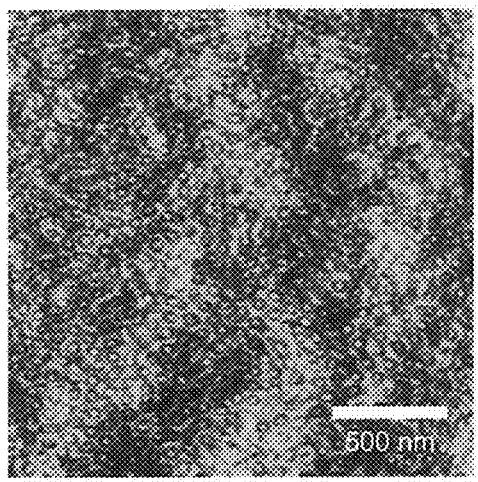
FIGS. 3 to 5 show respectively atomic force micrographs (AFM) of one of the embodiments of the nanoporous film formed from a diblock polymer: as cast film (FIG. 3); the film swollen with butanol, exchanged with ethanol and extracted with water (FIG. 4); and the film immersed in butanol and dried (FIG. 5).
Figure 4:
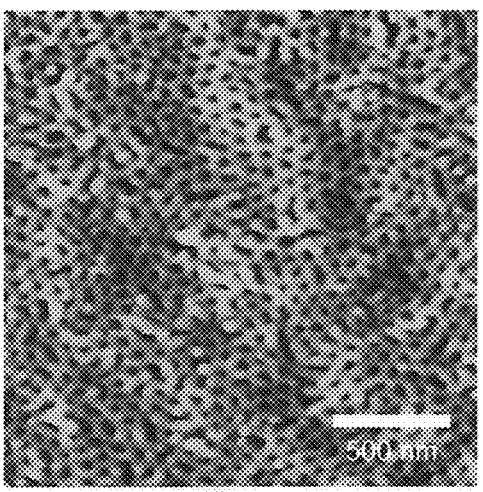

Turning now to FIG. 3, which shows AFM micrographs of the as cast film formed from a diblock polymer of BuNB-HFANB (46:54 molar ratio). It is apparent from FIG. 3 that the cast film is flat and exhibits an unexpected morphology with many toroidal-like structure arranged on an apparent hexagonal lattice. Swelling of the film with butanol, exchange with ethanol, and extraction with water, as described herein results in film featuring morphological structure as depicted in FIG. 4. It is apparent from FIG. 4 that the film so formed is nanoporous, and the porosity of this film is determined to be 69% as determined by the Bruggemann equation, as discussed hereinabove. It should be noted that this level of porosity is nearly three times the porosity reported previously for polystyrene-block-poly(2-vinyl pyridine) (PS-b-P2VP) generated by swelling by ethanol. See for example, J. Yin, et al., ACS Nano, 7, 9961-9974, (2013). It is further evident from FIG. 4 that the porous film of this invention exhibits self-assembled morphology than the as-cast film. Moreover, examination of the height profile illustrates that the film goes from smooth for the as cast film to very rough associated with the formation of nanopores. The refractive index of the as cast film (FIG. 3) was measured to be 1.47, whereas the refractive index of the porous film formed after swelling in butanol and extracted with ethanol and water (FIG. 4) was 1.14.

Figure 5:
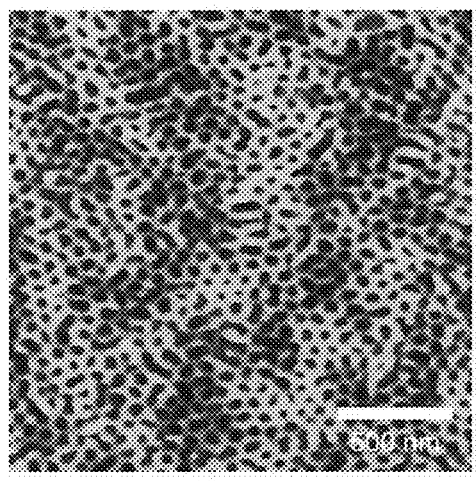

Whereas, FIG. 5 shows the atomic force micrograph of the film which was immersed only in butanol and dried. Further, the film thus formed as shown in FIG. 5 is found to be non-porous. This clearly illustrates the switchable nature of the swelling induced porosity, thus offering at least one of the surprising beneficial effects from the practice of this invention. This aspect further demonstrates that as pores are formed through a physical process, the porous structure in the diblock polymer films can be removed by simply immersing the film in butanol drying directly in air. It should additionally be noted that through this process, the refractive index of the film increases from 1.14 to 1.47, which is the same as as-cast film, as discussed above. However, the surface morphology of this non-porous film is similar to the porous film and some of the surface roughness remains, likely due to vitrification as the butanol evaporates.

As noted above the nanoporous films as formed in accordance with this invention are also found to be useful as anti-reflective coatings. Accordingly, it is further provided that an antireflective coating encompassing the film of this invention which are formed using any of the diblock polymer of formula (I) or any of the triblock polymer of formula (III) or (IV) as described herein.

In a further aspect of this invention there is also provided a method for forming an antireflective coating on a substrate comprising:

coating a substrate with a solution of any of diblock polymer of formula (I) or any of the triblock polymer of formula (III) or (IV) as described herein;

drying the substrate at a suitable temperature;

treating said substrate with ($C_4$-$C_6$)alkanol for sufficient length of time to cause phase separation of said block polymer and then immersing said substrate sequentially in ($C_2$-$C_3$)alkanol and water; and drying said substrate at a suitable temperature.

Again, as described herein the coating of the substrate with the polymer solution can be carried out by any of the procedures known in the art including the procedures as described hereinabove. Similarly, the drying of the substrates before and after alcohol swelling can also be carried out as described hereinabove at any of the temperature conditions which will bring about the intended effect, including employing inert atmospheric conditions if such conditions are required for the intended result.

Advantageously, it has now been found that the transparent nature of the porous films of this invention along with their highly tunable refractive indices (from 1.1 to 1.6 or higher) makes them attractive candidate for anti-reflective coatings to improve transmission. In general, maximizing the transmission requires:

(1) the light amplitudes reflected at both interfaces must be equal:

$$n_f = \sqrt{n_0 n_s}$$

where $n_f$, $n_0$ and $n_s$ are refractive indices of anti-reflective coating, air and the substrate respectively; and (2) the reflected wave interfere destructively to incident wave:

$$d = \frac{\lambda}{4}$$

where d is the thickness of coating and λ is the wavelength of light. As the refractive index for glasses is approximately 1.5, the refractive index of anti-reflective coating should be approximately 1.22. Human eyes are most sensitive to 555 nm light, which provides the optimum thickness of the coating as 139 nm.

Advantageously it has now been found that the nanoporous thin films formed from the diblock or triblock polymers of this invention match the required refractive index for maximizing transmission. Spin coating on both sides of the substrate further reduces the light reflection. This simple fabrication process provides a facile and effective way to produce anti-reflective coating.

The following examples are detailed descriptions of methods of preparation and use of certain compounds/monomers, polymers and compositions of the present invention. The detailed preparations fall within the scope of, and serve to exemplify, the more generally described methods of preparation set forth above. The examples are presented for illustrative purposes only, and are not intended as a restriction on the scope of the invention. As used in the examples and throughout the specification the ratio of monomer to catalyst is based on a mole to mole basis.

This invention is further illustrated by the following examples which are provided for illustration purposes and in no way limit the scope of the present invention.

EXAMPLES

The following abbreviations have been used hereinbefore and hereafter in describing some of the compounds, instruments and/or methods employed to illustrate certain of the embodiments of this invention:

HFANB: norbornenyl-2-trifluoromethyl-3,3,3-trifluoropropan-2-ol; BuNB: 5-butylbicyclo-[2.2.1]hept-2-ene; PGMEA: propylene glycol methyl ether acetate; PTFE: polytetrafluoroethylene; TFT: trifluorotoluene; R. T.—room temperature.

The following examples describe the procedures used for the preparation of various compounds as disclosed herein including certain of the starting materials employed in the preparation of the compounds of this invention. However, it should be noted that these examples are intended to illustrate the disclosure without limiting the scope thereof.

The diblock and triblock polymers of this invention can be prepared by any of the procedures known in the art. See for example, copending patent application, U.S. Provisional Application No. 62/037,809, filed Aug. 15, 2014, pertinent portions of which is incorporated herein by reference.

Example 1

Diblock Polymer of BuNB and HFANB
(BuNB-b-HFANB, 55:45 Mole Ratio)

The polymerization catalyst used in this Example was allylpalladium(triisopropylphosphine) chloride, [Pd(allyl)(triisopropylphosphine)Cl] along with lithium tetrakis(pentafluoroborate) along with lithium tetrakis(pentafluoroborate), LiFABA, at a 100:100:1:1 molar ratio of monomer 1:monomer 2:catalyst:LiFABA. The polymerization was carried out in a 50:50 (v/v) mixture of toluene and trifluorotoluene at room temperature. The monomer 1, HFANB, was first polymerized at room temperature for 60 minutes. Then the monomer 2, BuNB, was added to the reaction mixture and the polymerization was continued for 15 minutes, the monomer conversion was 100%. At which time the polymerization was stopped and the polymer isolated. The resulting diblock polymer, HFANB-b-BuNB, exhibited $M_n$ of 106,000 with a PDI of 1.2 by GPC. The molar ratios of monomer BuNB to HFANB was determined to be 45:55, and the volume fraction of poly-HFANB, $f_{HFANB}$ (V/V) in the copolymer was determined to be 0.5.

Example 2

Diblock Polymer BuNB-b-HFANB (46:54 Mole Ratio)

Example 1 was substantially repeated in this Example 2 except for using different molar ratios of the monomers to obtain the title polymer: $M_n$=74,000, PDI 2.1, and $f_{HFANB}$ (V/V) was 0.59.

Example 3

BuNB-b-HFANB Nanoporous Films

Any of the diblock or triblock polymer of formulae (I), (III) and (IV) as described herein, for instance as specifically disclosed in Examples 1 or 2, is dissolved in an organic solvent to make a solution which is then filtered. After filtration, trapped gas is removed. The polymer is poured onto a substrate and pulled to form a film, dried and ready for use. In some cases, the film is dried and can be removed from the substrate and used as unsupported film.

Specifically, polymer formed in Example 1 (10 g) was dissolved in THF (100 g) to make a solution which was filtered through a 5 micron nylon filter. After filtration, the solution was allowed to roll overnight on a jar roller to remove trapped gas introduced during the filtration. The polymer solution was poured onto a PAN ultrafiltration substrate and pulled, using a Gardner Film Casting Knife to form a film having an essentially uniform thickness. The film was allowed to dry in the air for one hour. The dried film was then immersed in butanol for 5 minutes and allowed to swell. The swollen film was then immersed in ethanol for 3 minutes and finally immersed in water for two minutes.

The resulting film was then characterized by atomic force microscopy (AFM, diDimension V, Veeco), in tapping mode at a scan rate of 1 Hz. Scanning electron microscope (SEM, Model JEOL-7401) was used to characterize the porous structure of BuNB-b-HFANB thin films as both top-down images and cross-sections. Before imaging, the samples were coated with Ag for 2 min with a K575 sputter coater. Transmission electron microscopy (TEM) was also used to characterize the pore structure. The porous thin films were floated on water from silicon wafer and collected by TEM grids (300 mesh Cu, TED PELLA Inc.). After drying in a vacuum oven at room temperature for 2 h, the films on TEM grids were characterized. To complement the microscopy characterization, grazing incidence small angle x-ray scattering (GISAXS) was used to characterize the as-cast and porous BuNB-b-HFANB thin films on the X9 beamline of National synchrotron Light Source (NSLS) at Brookhaven National Laboratory. An incident X-ray beam with energy of 13.5 keV and wavelength of 0.918 Å was used. Incident angles of 0.07°, 0.10°, 0.15°, 0.2° and 0.3° were used for the GISAXS measurements.

The modulus of the porous thin films was measured using surface wrinkling. Poly(dimethyl siloxane) (PDMS, Sylgard 184, Dow Corning) with dimensions of 25 mm×75 mm×2 mm was used as the compliant substrate for wrinkling measurement. PDMS was prepared with ratio of base to curing agent of 20:1 w:w and cured at 120° C. for 3 h. The Young's modulus of the PDMS was measured using Texture Analyzer (TA-TX Plus) at a strain rate of 0.05 mm/s.

For surface wrinkling, the PDMS strips were pre-strained to 4.5% and the porous thin films were transferred from silicon wafer to PDMS. This transfer was assisted by immersion in water, while exploiting the differential adhesion of the film between the substrate and PDMS in water. After transfer, the polymer thin films were dried at ambient conditions for 12 h. Wrinkling was induced by releasing the pre-strain on PDMS at 0.1 mm/s using a Universal Motion Controller (Model: Esp100, Newport). The wrinkling was characterized using optical microscopy (Olympus MX51) and the wavelength was calculated using a fast Fourier transform (FFT) of the images. At least 8 micrographs were used to statistically calculate the wrinkle wavelength. At low strain, the modulus of the porous film, $\overline{E}_f$, can be calculated from the wavelength, λ, as $$\overline{E}_f = 3\overline{E}_s \left(\frac{\lambda}{2\pi h}\right)^3$$

where $\overline{E}_s$ is the plane-strain modulus of the PDMS substrate, and h is the film thickness.

Figure 6:
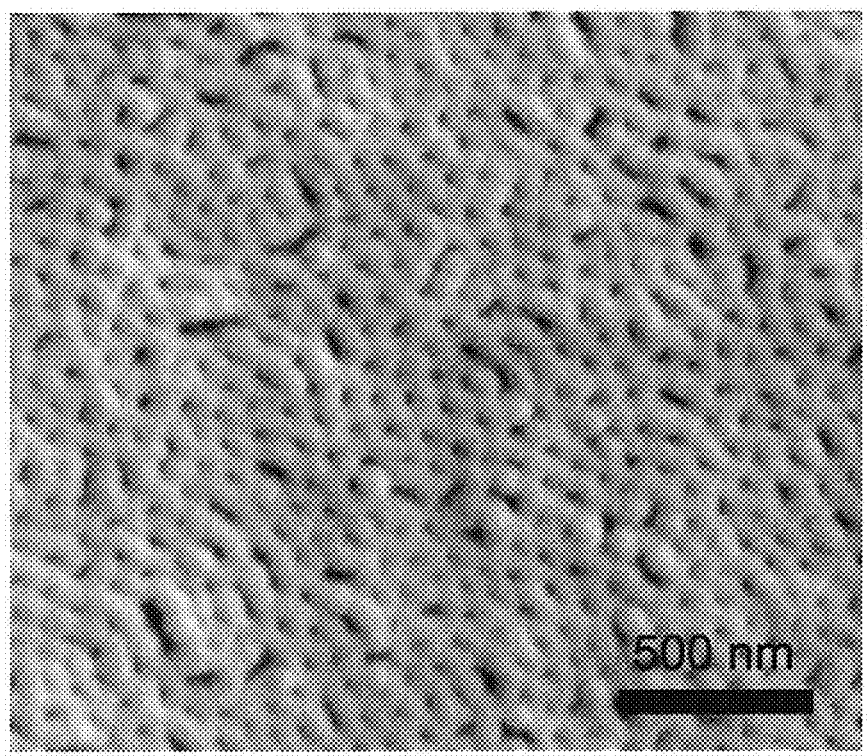
FIGS. 6 and 7 show respectively scanning electron micrograph (SEM) images of a nanoporous film obtained in accordance with one of the embodiments of this invention: top down view (FIG. 6); and cross-sectional view (FIG. 7).
Figure 7:
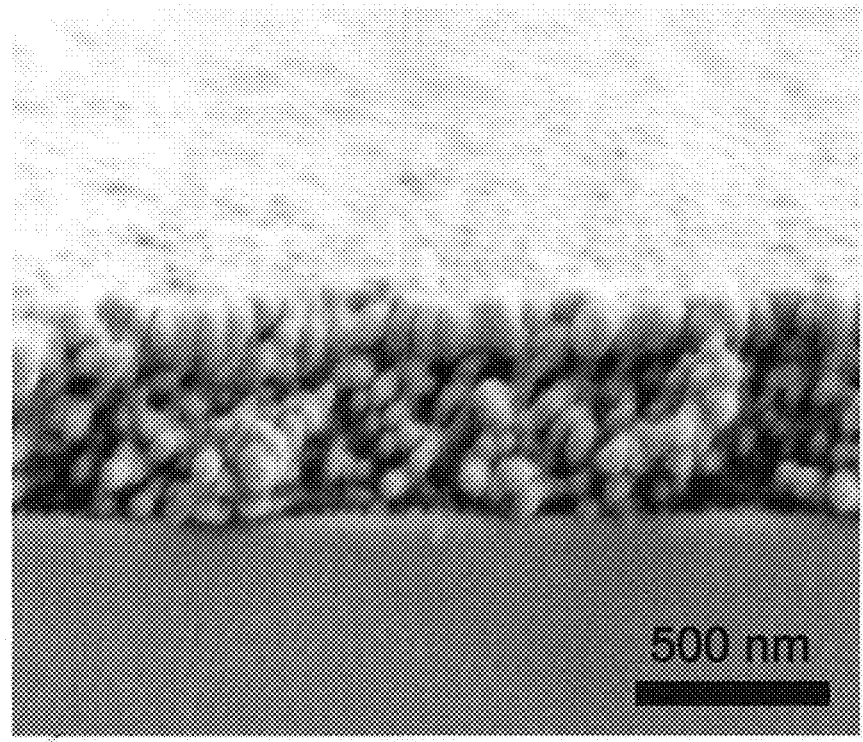

The pores in the films formed from a diblock polymer of Example 2 were characterized by scanning electron microscopy (SEM) as shown in FIG. 6, which illustrates the surface of the porous film via top-down SEM. The surface primarily contains circular pores, but it is also evident there are some elongated pores, which are consistent with short parallel cylinders. FIG. 7 illustrates the cross section of this film. The nanopores near the free surface are aligned perpendicularly to the plane of the film, while the pores within the film are more interconnected. The pore size is less than 50 nm as estimated from these micrographs. As water extraction appears to be the critical step to achieve a highly porous film, ethanol is also used to generate a nanoporous structure in forming these films. In this case, the ethanol is directly extracted by water. The thickness of the film expands from 186 nm to 357 nm to produce 54% porosity; this is significantly less porous than the film obtained when using butanol first to swell the film (porosity in this case was 69%), but the porosity still is significantly greater than typically obtained from solvent induced swelling of other block copolymers reported in the literature.

Example 4

Anti-Reflective Coatings

A diblock or triblock polymer solution as prepared in accordance with the procedures set forth in Example 3 were used to coat a glass substrate. The block polymer coated glass substrate was then treated with butanol and then with ethanol and water or ethanol and water essentially following the procedures of Example 3 to form the nanoporous anti-reflective coatings of this Example 4.

A variable angle spectroscopic ellipsometer (VASE, J. A. Woollam Co., Inc.) was used to measure the film thickness and refractive index of the supported films using a wavelength range from 300 nm to 1689 nm. The ellipsometric data were collected at 3 different angles (65°, 70° and 75°). The optical properties of the polymer films were obtained by fitting the ellipsometric data using a Cauchy model.

The transmittance of blank and nanoporous films coated glass slides was measured using a UV/V is spectrophotometer (Model 8453, Hewlett-Packard/Agilent) over a wavelength range from 350 nm to 1000 nm.

Figure 8:
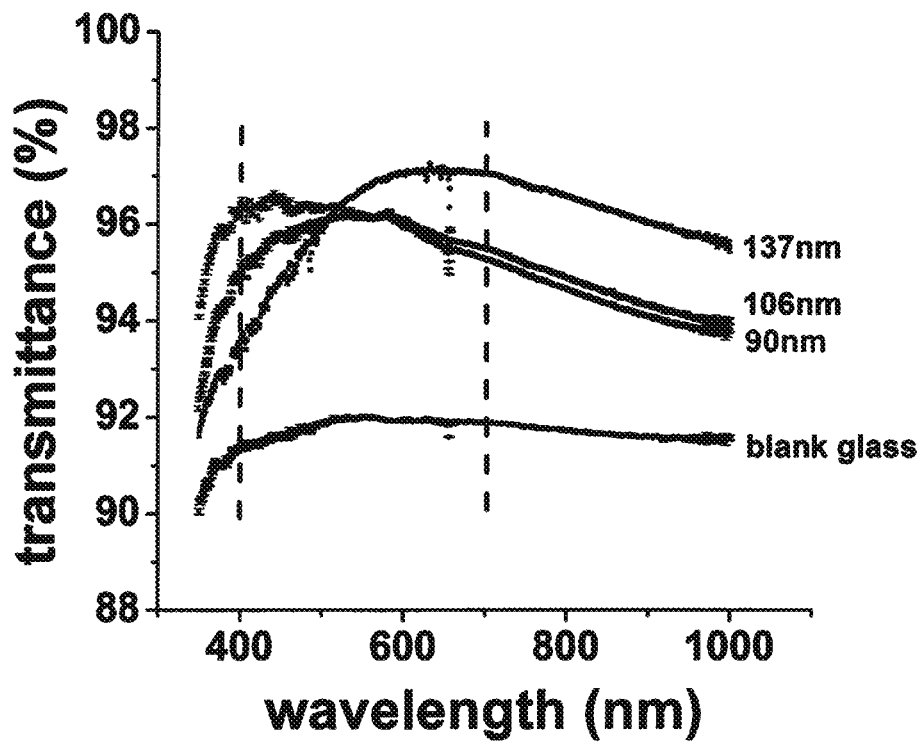
FIGS. 8 and 9 show respectively transmittance of glass slides coated with a nanoporous film of one of the embodiments of this invention: the nanoporous film coated only one side of glass (FIG. 8); and the nanoporous film coated on both sides of glass (FIG. 9). The vertical dashed lines denote the visible range, 400 to 700 nm.

The nanoporous thin films from butanol swollen thin film (formed from 55:45 mole ratio BuNB-b-HFANB, Example 1) at 80° C. and ethanol swollen thin film (formed from 46:54 mole ratio BuNB-b-HFANB, Example 2) match the required refractive index for maximizing transmission. FIG. 8 illustrates the change in transmittance of a glass slide that is coated with nanoporous thin films (formed from 55:45 mole ratio BuNB-b-HFANB, Example 1). The refractive indices of these films with thicknesses of 90 nm, 106 nm and 137 nm are between 1.2 and 1.22 at 7=633 nm. The transmittance of the glass substrate without coating is between 91%-92% in the visible range as denoted by vertical dashed lines in FIG. 8. The transmittance increases in all cases to a maximum between 96% and 97% with the peak transmittance shifting to higher wavelengths for the thicker films as expected. These peaks should be at 360 nm, 424 nm and 548 nm for 90 nm, 104 nm and 137 nm coatings, respectively. However, the peaks are experimentally observed at higher wavelength. As the surface of these coatings is rough as shown in FIGS. 6 and 7, as discussed above, ellipsometry might underestimate the thickness as reported previously for polymeric gratings.

Figure 9:
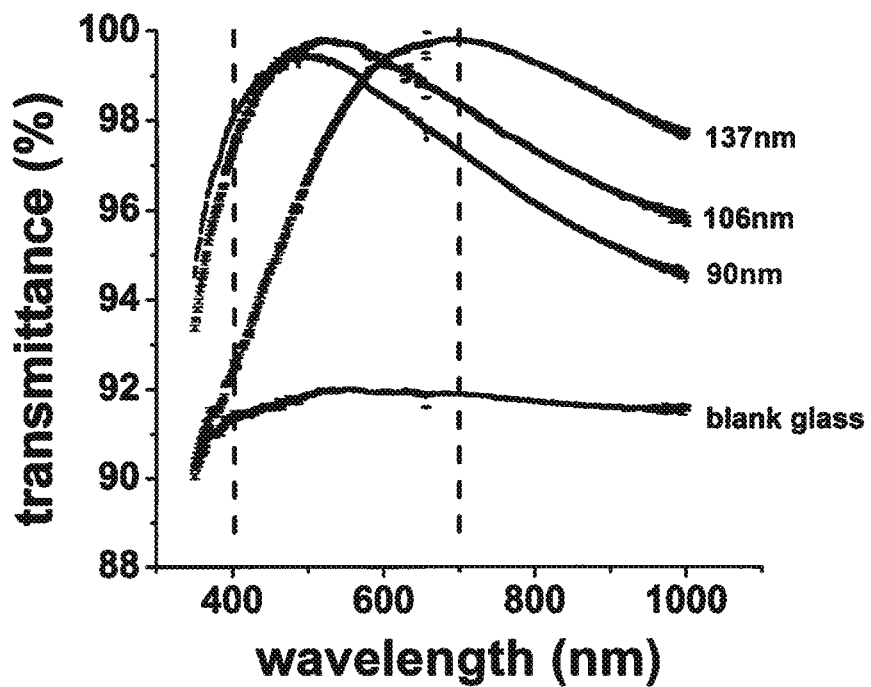

Spin coating the substrates on both sides further reduces the light reflection. FIG. 9 illustrates the transmittance of the double-side (DS) coated glass. In this case, the best performance is found for a 106 nm thick coating on both sides. The transmittance is greater than 97.3% across the visible range with an average of transmittance of 99.1% and the maximum transmittance, 99.8%, at 523 nm wavelength nearly matches the most sensitive wavelength (555 nm). This simple fabrication process provides a facile and effective way to produce anti-reflective coating.

The high glass transition temperature of the diblock or triblock polymers of this invention provides thermal stability for these anti-reflective coatings that cannot typically be obtained for other polymers. The morphology of a nanoporous film formed from the diblock polymer of Example 2 (porosity=60%) after heating at 160° C. for 12 hours was unchanged. The refractive index was also mostly unchanged increasing slightly from 1.179 to 1.184, which corresponds to porosity of 59% for the annealed film. This suggests the nanoporous polymer structure is exceptional for resisting high temperature deformation.

Example 5

Tuning the Porosity of Nanoporous Films

This Example 5 illustrates the tunability of the porosity of the thin films of this invention. This can be achieved by the type of solvent employed for swelling of the film as well as the volume fraction of the individual blocks present in a diblock or triblock polymer of this invention. For example the volume fraction of A and B present in a diblock polymer can be varied to tune the desirable porosity in the resulting film. The block polymers of Examples 1 and 2 were used in this Example 5 to demonstrate the effect of volume fraction of individual blocks, HFANB and BuNB, on the porosity of the resulting film and employing different alcohols to vary the swelling effect.

TABLE 1

| Example No. | Block Polymer | Initial Solvent[a] | Porosity (P) | n |
|---|---|---|---|---|
| Example 5A | Example 1 | Butanol (80° C.) | 0.55 | 1.21 |
| Example 5B | (BuNB-b-HFANB) | Butanol | 0.44 | 1.27 |
| Example 5C | (55:45) | Ethanol | 0.32 | 1.33 |
| Example 5D | Example 2 | Butanol | 0.69 | 1.14 |
| Example 5E | (BuNB-b-HFANB) | IPA | 0.57 | 1.19 |
| Example 5F | (46:54) | Ethanol | 0.54 | 1.21 |
| Example 5G | | 90 wt. % ethanol | 0.45 | 1.25 |
| Example 5H | | 80 wt. % ethanol | 0.35 | 1.30 |
| Example 5I | | 75 wt. % ethanol | 0.17 | 1.38 |
| Example 5J | | 70 wt. % ethanol | 0.10 | 1.42 |

[a]All solvents at 23° C. unless noted; water was used extract the solvent; n = refractive index; IPA—isopropanol In each of these examples the films were initially immersed in the solvent as listed in Table 1 and then extracted with water, porosity (P) and refractive index of each these samples were then measured. The results are summarized in Table 1.

It is evident from the data presented in Table 1, the porosity of the film increases with increasing HFANB content and increasing length of the alkyl chain of the alcohol. The highest porosity is obtained using butanol and the polymer of Example 2 (BuNB-b-HFANB, 46:54 mole ratio). The porosity (69%) calculated from the refractive index is similar to the thickness expansion (63%). For ethanol, the porosity is still greater than 50% for polymer of Example 1, but lower porosities can be obtained by decreasing the solvent quality using aqueous ethanol solutions. By changing the ethanol content from 70 wt. % to 100 wt. %, the porosity can be tuned from 10% to 54%, which enables well defined refractive indices for these coatings.

When decreasing the HFANB content to 45 mol %, i.e., polymer of Example 1 (BuNB-b-HFANB, 55:45 mole ratio), there is a marked decrease in the porosity of the films by nearly 40% for both butanol and ethanol. The porosity of the film can also be significantly be increased by treating the film in alcohol solvent at higher temperature. This is manifested by carrying out the solvent swelling of the film of polymer of Example 1, where swollen by butanol at 80° C., dramatically increases the porosity of the film; with this processing, the porosity was increased substantially and greater than 50% porosity can be obtained for the polymer of Example 1 as well.

Example 6

Preparation of a Membrane

The film as formed in Example 3 can be used as such as unsupported film as pervaporation membrane.

Double Thickness Film: Double thickness films are prepared in a similar manner to the single film except that a second layer of the solution is provided over the first film before the first film is removed from substrate, and then pulling the second film. After the second pass is pulled, the double film is dried and then removed from the substrate and ready for use.

For example, the single thickness film example described above is followed, except that about 5 hours after the first film casting, a second layer is provided by pouring a second aliquot of the polymer solution over the first film and pulling it with a Gardner Film Casting Knife. After the second pass is pulled, the film is treated with desirable alcohol solvent substantially following the procedures set forth in Example 3 to produce the nanoporous film which can be used as a pervaporation membrane.

Example 7

Pervaporation Test

The membrane was cut into 2 inch diameter circles for installation into a capsule that was then placed in the pervaporation testing device. The charge liquid in the testing device was heated to desired temperature circulating in by-pass mode and then circulated through the membrane housing at 450 mL/min in the continuous mode to check for any leaks. After this check was completed a vacuum was pulled on the dry side of the membrane and any permeate was collected into a cooled trap (cooled with liquid nitrogen). The system was allowed to run for three hours, collected permeate was warmed to room temperature and evaluated.

Evaluation of the Permeate

The room temperature permeate collected as described above was separated into a two-phase liquid. To this permeate, MeOH was added to make the phases miscible, thus providing a single phase permeate. The single phase permeate (1 gram) was added to a GC sampling vial containing 0.02 g PGMEA and mixed thoroughly. A sample from the vial was then injected into a Gas Chromatograph where the % butanol or % phenol was determined by evaluating the area of the butanol or phenol peak with respect to the PGMEA standard.

In addition to forming a flat sheet membrane supported on PAN ultrafiltration substrate, the possibility of forming hollow fibers that encompass the block polymer embodiments of the present invention can be evaluated. The following procedure is used to successfully form hollow fibers for further evaluation.

The following Comparative Example 1 is provided here to illustrate the effect of porosity of the films in achieving the anti-reflective coating properties as described herein.

Comparative Example 1

Non-Porous Coating

Example 4 was substantially followed in this Comparative Example 1 except that the glass substrate was coated with a block polymer of this invention and was not treated with alcohols in order to form the nanoporous coating.

Figure 10:
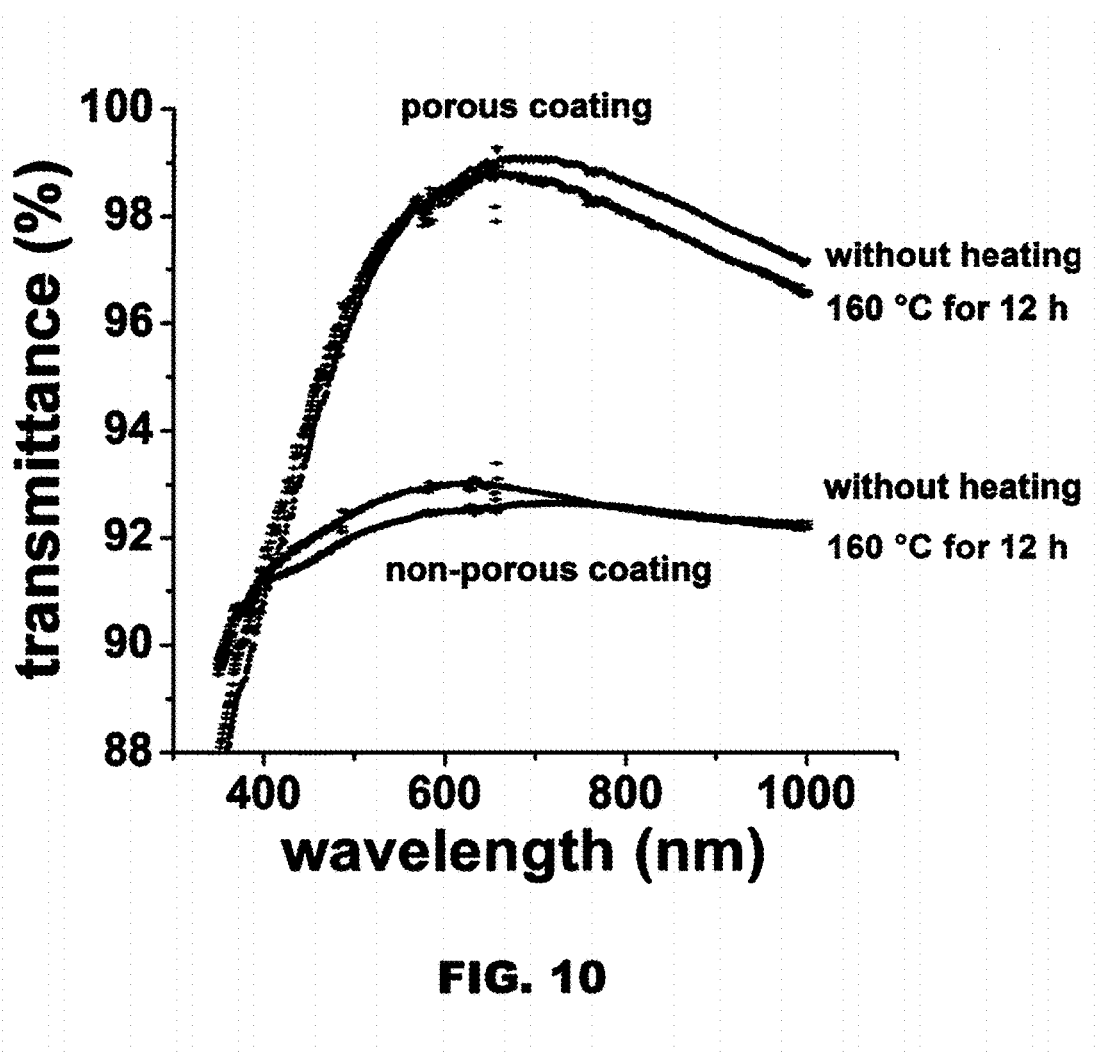
FIG. 10 shows transmittance of glass slides coated with a nanoporous film of one of the embodiments of this invention before and after heat treatment at 160° C. for 12 hours; also shown in FIG. 10 is the comparative transmittance data observed for the non-porous coating of the same diblock polymer.

FIG. 10 shows the transmittance of a glass slide that is coated with non-porous film (formed from 55:45 mole ratio BuNB-b-HFANB, Example 1). For comparison, the transmittance of a glass slide that is coated with nanoporous film formed from the same polymer is also shown. It is evident from this data that the nanoporous film coated glass slide exhibits maximum transmittance around 96% to 97%, whereas the non-porous coated glass slide exhibits inferior transmittance of about 92% to 93%. Also shown in FIG. 10 is the effect of heating the glass slide to a temperature of 160° C. for 12 hours. It is again evident from FIG. 10 that the transmittance of nanoporous film coated glass slide is unaffected even after such long heat treatment.

Although the invention has been illustrated by certain of the preceding examples, it is not to be construed as being limited thereby; but rather, the invention encompasses the generic area as hereinbefore disclosed. Various modifications and embodiments can be made without departing from the spirit and scope thereof.

What is claimed is:

1. A nanoporous film comprising a diblock polymer of the formula (I):

$$(A)_a\text{-}b\text{-}(B)_c \qquad (I);$$

where a and c are integers of at least 15;
b denotes a bond;
A and B are different from each other and independently selected from a repeat unit represented by formula (IIA), said repeat unit is derived from a monomer of formula (II):

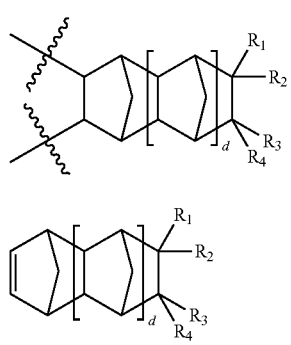

wherein:
⌇ denotes a place of bonding with another repeat unit;
d is an integer 0, 1 or 2;

where for repeat unit A, at least one of $R_1$, $R_2$, $R_3$ and $R_4$ is selected from the group consisting of formulae D, E, F, G and H:

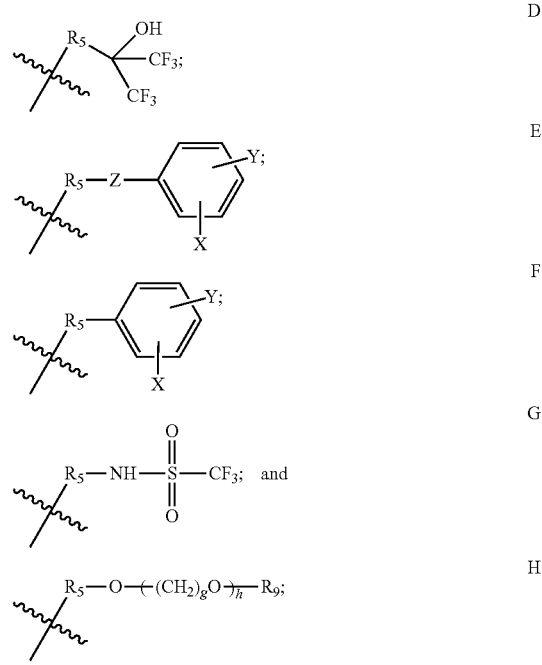

where g and h are integers from 1 to 4;
$R_5$ is a bond or $(C_1\text{-}C_6)$alkylene or $(C_1\text{-}C_4)$alkylene-O—$(C_1\text{-}C_4)$alkylene;
$R_9$ is $(C_1\text{-}C_{16})$alkyl;
X is hydroxy or $(C_1\text{-}C_4)$alkanoyl;
Y is hydrogen, linear or branched $(C_1\text{-}C_{16})$alkyl, $(C_6\text{-}C_{10})$aryl$(C_1\text{-}C_3)$alkyl, linear or branched $(C_1\text{-}C_{16})$alkoxy or $(C_6\text{-}C_{10})$aryl$(C_1\text{-}C_3)$alkoxy; and
Z is

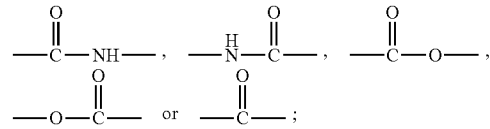

the remaining $R_1$, $R_2$, $R_3$ and $R_4$ are the same or different and each independently of one another is selected from hydrogen, linear or branched $(C_1\text{-}C_{16})$alkyl, hydroxy $(C_1\text{-}C_{16})$alkyl, perfluoro$(C_1\text{-}C_{12})$alkyl, $(C_3\text{-}C_{12})$cycloalkyl, $(C_6\text{-}C_{12})$bicycloalkyl, $(C_7\text{-}C_{14})$tricycloalkyl, $(C_6\text{-}C_{10})$aryl, $(C_6\text{-}C_{10})$aryl$(C_1\text{-}C_3)$alkyl, perfluoro$(C_6\text{-}C_{10})$aryl, perfluoro$(C_6\text{-}C_{10})$aryl$(C_1\text{-}C_3)$alkyl, hydroxy, $(C_1\text{-}C_{12})$alkoxy, $(C_3\text{-}C_{12})$cycloalkoxy, $(C_6\text{-}C_{12})$bicycloalkoxy, $(C_7\text{-}C_{14})$tricycloalkoxy, $(C_6\text{-}C_{10})$aryloxy$(C_1\text{-}C_3)$alkyl, $(C_5\text{-}C_{10})$heteroaryloxy$(C_1\text{-}C_3)$alkyl, $(C_6\text{-}C_{10})$aryloxy, $(C_5\text{-}C_{10})$heteroaryloxy, $(C_1\text{-}C_6)$acyloxy; and
where for repeat unit B, $R_1$, $R_2$, $R_3$ and $R_4$ are the same or different and each independently of one another is selected from hydrogen, linear or branched $(C_1\text{-}C_{16})$alkyl, perfluoro$(C_1\text{-}C_{12})$alkyl, $(C_3\text{-}C_{12})$cycloalkyl, $(C_6\text{-}C_{12})$bicycloalkyl, $(C_7\text{-}C_{14})$tricycloalkyl, $(C_5\text{-}C_{10})$aryl, $(C_6\text{-}C_{10})$aryl$(C_1\text{-}C_3)$alkyl, perfluoro$(C_6\text{-}C_{10})$aryl, perfluoro($C_6$-$C_{10}$)aryl($C_1$-$C_3$)alkyl, ($C_1$-$C_{12}$)alkoxy, ($C_3$-$C_{12}$)cycloalkoxy, ($C_6$-$C_{12}$)bicycloalkoxy, ($C_7$-$C_{14}$)tricycloalkoxy, ($C_6$-$C_{10}$)aryloxy($C_1$-$C_3$)alkyl and ($C_6$-$C_{10}$)aryloxy.

2. The film according to claim 1 wherein said polymer is a triblock polymer of formula (III):

$(A)_a$-b-$(B)_c$-b-$(A)_e$ (III);

where a, b, c, A and B are as defined in claim 1 and e is an integer of at least 15; or
a triblock polymer of formula (IV):

$(A)_a$-b-$(B)_c$-b-$(C)_f$ (IV);

where a, b, c, A and B are as defined in claim 1 and f is an integer of at least 15;
C is different from A or B and independently selected from a repeat unit represented by formula (IIA), said repeat unit is derived from a monomer of formula (II) wherein at least one of $R_1$, $R_2$, $R_3$ and $R_4$ is selected from the group consisting of formulae I, J, K, L, M and N:

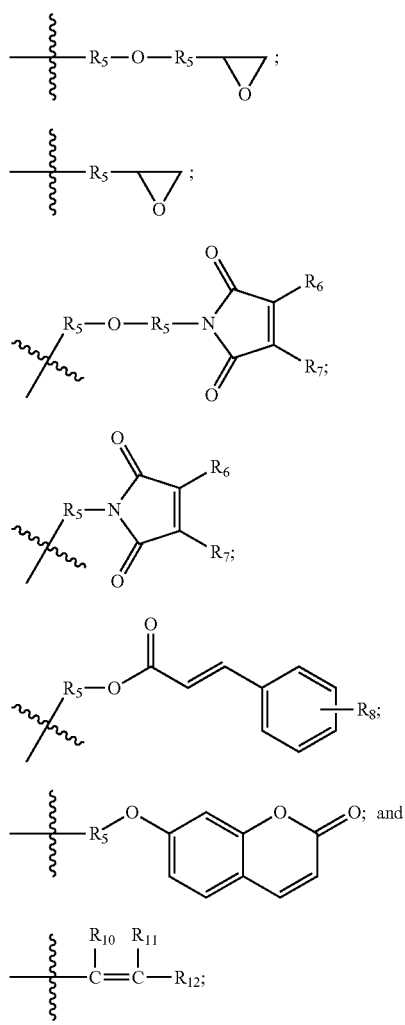

where $R_5$ is ($C_1$-$C_6$)alkylene or ($C_1$-$C_4$)alkylene-O—($C_1$-$C_4$)alkylene;
$R_6$ and $R_7$ are each independently of one another hydrogen or ($C_1$-$C_4$)alkyl; and $R_8$ is hydrogen, ($C_1$-$C_4$)alkyl or ($C_1$-$C_4$)alkoxy;
$R_{10}$ and $R_{11}$ are each independently of one another hydrogen, ($C_1$-$C_4$)alkyl, ($C_6$-$C_{10}$)aryl or ($C_6$-$C_{10}$)aryl($C_1$-$C_4$)alkyl;
$R_{12}$ is —CN, —$CO_2R_{13}$, where $R_{13}$ is hydrogen, ($C_1$-$C_4$)alkyl, ($C_6$-$C_{10}$)aryl or ($C_6$-$C_{10}$)aryl($C_1$-$C_4$)alkyl; and
each of the remaining $R_1$, $R_2$, $R_3$ and $R_4$ is hydrogen.

3. The film according to claim 2, wherein the polymer is selected from the group consisting of:
a triblock polymer derived from norbornenyl-2-trifluoromethyl-3,3,3-trifluoropropan-2-ol, 5-decylbicyclo[2.2.1]hept-2-ene and norbornenyl-2-trifluoromethyl-3,3,3-trifluoropropan-2-ol (HFANB-b-DecNB-b-HFANB);
a triblock polymer derived from norbornenyl-2-trifluoromethyl-3,3,3-trifluoropropan-2-ol, 5-butylbicyclo[2.2.1]hept-2-ene, and norbornenyl-2-trifluoromethyl-3,3,3-trifluoropropan-2-ol (HFANB-b-BuNB-b-HFANB);
a triblock polymer derived from norbornenyl-2-trifluoromethyl-3,3,3-trifluoropropan-2-ol, 5-octylbicyclo[2.2.1]hept-2-ene and 1-(4-(bicyclo[2.2.1]hept-5-en-2-yl)butyl)-3,4-dimethyl-1H-pyrrole-2,5-dione (HFANB-b-OctNB-b-BuDMMINB); and
a triblock polymer derived from norbornenyl-2-trifluoromethyl-3,3,3-trifluoropropan-2-ol, 5-butylbicyclo[2.2.1]hept-2-ene and 1-(4-(bicyclo[2.2.1]hept-5-en-2-yl)butyl)-3,4-dimethyl-1H-pyrrole-2,5-dione (HFANB-b-BuNB-b-BuDMMINB).

4. An antireflective coating comprising the film according to claim 2.

5. The film according to claim 1, wherein the diblock polymer is selected from the group consisting of:
a diblock polymer derived from 5-hexylbicyclo[2.2.1]hept-2-ene and norbornenyl-2-trifluoromethyl-3,3,3-trifluoropropan-2-ol (HexNB-b-HFANB);
a diblock polymer derived from 5-butylbicyclo[2.2.1]hept-2-ene and norbornenyl-2-trifluoromethyl-3,3,3-trifluoropropan-2-ol (BuNB-b-HFANB);
a diblock polymer derived from 5-decylbicyclo[2.2.1]hept-2-ene and norbornenyl-2-trifluoromethyl-3,3,3-trifluoropropan-2-ol (DecNB-b-HFANB); and
a diblock polymer of derived from norbornenyl-2-trifluoromethyl-3,3,3-trifluoropropan-2-ol and 2-(bicyclo[2.2.1]hept-5-en-2-yl)bicyclo[2.2.1]heptane (HFANB-b-NBANB).

6. A pervaporation membrane comprising the film according to claim 1.

7. The pervaporation membrane according to claim 6, in a form of a tubular composite, hollow fiber, a dense film flat sheet, or a thin film composite.

8. The pervaporation membrane according to claim 7, which is capable of preferential permeability to a volatile organic over water, said permeability increasing with increasing organic concentration of a feed stream.

9. The pervaporation membrane according to claim 8, wherein said volatile organic comprises butanol.

10. The pervaporation membrane according to claim 8, wherein said volatile organic comprises phenol.

11. The pervaporation membrane according to claim 9 having a flux for butanol of at least about 100 $g/m^2$*h from a fermentation broth comprising at least about 1% by weight butanol, wherein the flux for butanol is an amount of butanol (g) that flows through an unit area ($m^2$) of the pervaporation membrane per unit of time (h).

12. A method of separating an organic product from a feedstock selected from a fermentation broth or a waste containing the organic product comprising:
charging the feedstock to a pervaporation module containing a pervaporation membrane according to claim 6; and
collecting a permeate vapor containing the organic product from the pervaporation module.

13. The method according to claim 12, wherein the fermentation broth charged to the pervaporation module has a temperature from about 30° C. to about 110° C.

14. The method according to claim 12, wherein the organic product is butanol or phenol.

15. The method according to claim 12, wherein the pervaporation membrane is formed from a film which is formed from a block polymer selected from:
a diblock polymer derived from 5-hexylbicyclo[2.2.1]hept-2-ene and norbornenyl-2-trifluoromethyl-3,3,3-trifluoropropan-2-ol (HexNB-b-HFANB);
a diblock polymer derived from 5-butylbicyclo[2.2.1]hept-2-ene and norbornenyl-2-trifluoromethyl-3,3,3-trifluoropropan-2-ol (BuNB-b-HFANB);
a diblock polymer derived from 5-decylbicyclo[2.2.1]hept-2-ene and norbornenyl-2-trifluoromethyl-3,3,3-trifluoropropan-2-ol (DecNB-b-HFANB);
a diblock polymer of derived from norbornenyl-2-trifluoromethyl-3,3,3-trifluoropropan-2-ol and 2-(bicyclo[2.2.1]hept-5-en-2-yl)bicyclo[2.2.1]heptane (HFANB-b-NBANB);
a triblock polymer derived from norbornenyl-2-trifluoromethyl-3,3,3-trifluoropropan-2-ol, 5-decylbicyclo[2.2.1]hept-2-ene and norbornenyl-2-trifluoromethyl-3,3,3-trifluoropropan-2-ol (HFANB-b-DecNB-b-HFANB);
a triblock polymer derived from norbornenyl-2-trifluoromethyl-3,3,3-trifluoropropan-2-ol, 5-butylbicyclo[2.2.1]hept-2-ene, and norbornenyl-2-trifluoromethyl-3,3,3-trifluoropropan-2-ol (HFANB-b-BuNB-b-HFANB);
a triblock polymer derived from norbornenyl-2-trifluoromethyl-3,3,3-trifluoropropan-2-ol, 5-octylbicyclo[2.2.1]hept-2-ene and 1-(4-(bicyclo[2.2.1]hept-5-en-2-yl)butyl)-3,4-dimethyl-1H-pyrrole-2,5-dione (HFANB-b-OctNB-b-BuDMMINB); and
a triblock polymer derived from norbornenyl-2-trifluoromethyl-3,3,3-trifluoropropan-2-ol, 5-butylbicyclo[2.2.1]hept-2-ene and 1-(4-(bicyclo[2.2.1]hept-5-en-2-yl)butyl)-3,4-dimethyl-1H-pyrrole-2,5-dione (HFANB-b-BuNB-b-BuDMMINB).

16. An antireflective coating comprising the film according to claim 1.

17. A method for forming an antireflective coating on a substrate comprising:
coating a substrate with a solution of block polymer according to claim 1;
drying the substrate at a suitable temperature;
treating said substrate with ($C_4$-$C_6$)alkanol for sufficient length of time to cause solvent swelling of said coating and then immersing said substrate sequentially in ($C_2$-$C_3$)alkanol and water; and
drying said substrate at a suitable temperature under inert atmosphere.

18. The method according to claim 17, wherein said polymer is selected from the group consisting of:
a diblock copolymer derived from 5-hexylbicyclo[2.2.1]hept-2-ene and norbornenyl-2-trifluoromethyl-3,3,3-trifluoropropan-2-ol (HexNB-b-HFANB);
a diblock copolymer derived from 5-butylbicyclo[2.2.1]hept-2-ene and norbornenyl-2-trifluoromethyl-3,3,3-trifluoropropan-2-ol (BuNB-b-HFANB);
a diblock polymer derived from 5-decylbicyclo[2.2.1]hept-2-ene and norbornenyl-2-trifluoromethyl-3,3,3-trifluoropropan-2-ol (DecNB-b-HFANB); and
a diblock polymer of derived from norbornenyl-2-trifluoromethyl-3,3,3-trifluoropropan-2-ol and 2-(bicyclo[2.2.1]hept-5-en-2-yl)bicyclo[2.2.1]heptane (HFANB-b-NBANB);
a triblock polymer derived from norbornenyl-2-trifluoromethyl-3,3,3-trifluoropropan-2-ol, 5-decylbicyclo[2.2.1]hept-2-ene and norbornenyl-2-trifluoromethyl-3,3,3-trifluoropropan-2-ol (HFANB-b-DecNB-b-HFANB);
a triblock polymer derived from norbornenyl-2-trifluoromethyl-3,3,3-trifluoropropan-2-ol, 5-butylbicyclo[2.2.1]hept-2-ene, and norbornenyl-2-trifluoromethyl-3,3,3-trifluoropropan-2-ol (HFANB-b-BuNB-b-HFANB);
a triblock polymer derived from norbornenyl-2-trifluoromethyl-3,3,3-trifluoropropan-2-ol, 5-octylbicyclo[2.2.1]hept-2-ene and 1-(4-(bicyclo[2.2.1]hept-5-en-2-yl)butyl)-3,4-dimethyl-1H-pyrrole-2,5-dione (HFANB-b-OctNB-b-BuDMMINB); and
a triblock polymer derived from norbornenyl-2-trifluoromethyl-3,3,3-trifluoropropan-2-ol, 5-butylbicyclo[2.2.1]hept-2-ene and 1-(4-(bicyclo[2.2.1]hept-5-en-2-yl)butyl)-3,4-dimethyl-1H-pyrrole-2,5-dione (HFANB-b-BuNB-b-BuDMMINB).

19. A method for forming a nanoporous film comprising:
forming a solution of a diblock polymer in a suitable organic solvent wherein said diblock polymer is of the formula (I):

$$(A)_a\text{-}b\text{-}(B)_c \qquad (I);$$

where a and c are integers of at least 15;
b denotes a bond;
A and B are different from each other and independently selected from a repeat unit represented by formula (IIA), said repeat unit is derived from a monomer of formula (II):

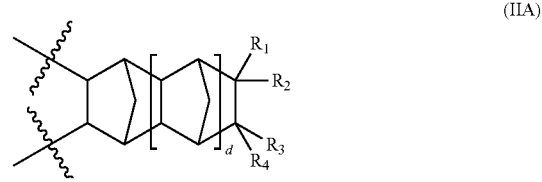

(IIA)

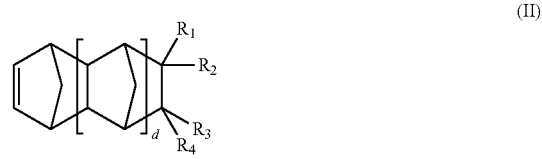

(II)

wherein:
∿ denotes a place of bonding with another repeat unit;
d is an integer 0, 1 or 2;
where for repeat unit A, at least one of $R_1$, $R_2$, $R_3$ and $R_4$ is selected from the group consisting of formulae D, E, F, G and H:

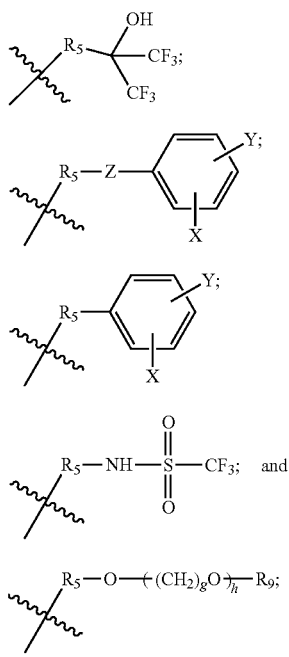

where g and h are integers from 1 to 4;
$R_5$ is a bond or $(C_1-C_6)$alkylene or $(C_1-C_4)$alkylene-O—$(C_1-C_4)$alkylene;
$R_9$ is $(C_1-C_{16})$alkyl;
X is hydroxy or $(C_1-C_4)$alkanoyl;
Y is hydrogen, linear or branched $(C_1-C_{16})$alkyl, $(C_6-C_{10})$aryl$(C_1-C_3)$alkyl, linear or branched $(C_1-C_{16})$alkoxy or $(C_6-C_{10})$aryl$(C_1-C_3)$alkoxy; and
Z is

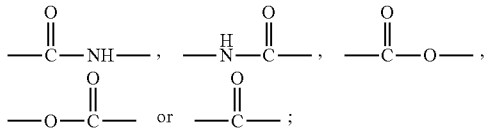

the remaining $R_1$, $R_2$, $R_3$ and $R_4$ are the same or different and each independently of one another is selected from hydrogen, linear or branched $(C_1-C_{16})$alkyl, hydroxy $(C_1-C_{16})$alkyl, perfluoro$(C_1-C_{12})$alkyl, $(C_3-C_{12})$cycloalkyl, $(C_6-C_{12})$bicycloalkyl, $(C_7-C_{14})$tricycloalkyl, $(C_6-C_{10})$aryl, $(C_6-C_{10})$aryl$(C_1-C_3)$alkyl, perfluoro$(C_6-C_{10})$aryl, perfluoro$(C_6-C_{10})$aryl$(C_1-C_3)$alkyl, hydroxy, $(C_1-C_{12})$alkoxy, $(C_3-C_{12})$cycloalkoxy, $(C_6-C_{12})$bicycloalkoxy, $(C_7-C_{14})$tricycloalkoxy, $(C_6-C_{10})$aryloxy$(C_1-C_3)$alkyl, $(C_5-C_{10})$heteroaryloxy$(C_1-C_3)$alkyl, $(C_6-C_{10})$aryloxy, $(C_5-C_{10})$heteroaryloxy, $(C_1-C_6)$acyloxy; and where for repeat unit B, $R_1$, $R_2$, $R_3$ and $R_4$ are the same or different and each independently of one another is selected from hydrogen, linear or branched $(C_1-C_{16})$alkyl, perfluoro$(C_1-C_{12})$alkyl, $(C_3-C_{12})$cycloalkyl, $(C_6-C_{12})$bicycloalkyl, $(C_7-C_{14})$tricycloalkyl, $(C_6-C_{10})$aryl, $(C_6-C_{10})$aryl$(C_1-C_3)$alkyl, perfluoro$(C_6-C_{10})$aryl, perfluoro$(C_6-C_{10})$aryl$(C_1-C_3)$alkyl, $(C_1-C_{12})$alkoxy, $(C_3-C_{12})$cycloalkoxy, $(C_6-C_{12})$bicycloalkoxy, $(C_7-C_{14})$tricycloalkoxy, $(C_6-C_{10})$aryloxy$(C_1-C_3)$alkyl and $(C_6-C_{10})$aryloxy;

coating said solution onto a suitable substrate to form a polymeric film on said substrate;

drying the substrate at a suitable temperature;

separating said film from said substrate;

immersing said film in $(C_4-C_6)$alkanol for sufficient length of time to cause solvent swelling of said film and then immersing said solvent swollen film in $(C_2-C_3)$alkanol; and immersing said $(C_2-C_3)$alkanol immersed film in water to remove residual $(C_2-C_3)$alkanol; and drying said film at a suitable temperature under inert atmosphere.

20. The method according to claim 19, wherein said polymer is selected from the group consisting of:
a diblock copolymer derived from 5-hexylbicyclo[2.2.1]hept-2-ene and norbornenyl-2-trifluoromethyl-3,3,3-trifluoropropan-2-ol (HexNB-b-HFANB);
a diblock copolymer derived from 5-butylbicyclo[2.2.1]hept-2-ene and norbornenyl-2-trifluoromethyl-3,3,3-trifluoropropan-2-ol (BuNB-b-HFANB);
a diblock polymer derived from 5-decylbicyclo[2.2.1]hept-2-ene and norbornenyl-2-trifluoromethyl-3,3,3-trifluoropropan-2-ol (DecNB-b-HFANB); and
a diblock polymer of derived from norbornenyl-2-trifluoromethyl-3,3,3-trifluoropropan-2-ol and 2-(bicyclo[2.2.1]hept-5-en-2-yl)bicyclo[2.2.1]heptane (HFANB-b-NBANB).

* * * * *